(12) United States Patent
Vassilovski et al.

(10) Patent No.: US 12,555,387 B2
(45) Date of Patent: Feb. 17, 2026

(54) IMAGE-COUPLED SENSOR SHARING FOR CLOUD-BASED DRIVING ASSISTANCE

(71) Applicant: QUALCOMM Incorporated, San Diego, CA (US)

(72) Inventors: Dan Vassilovski, Del Mar, CA (US); Gene Wesley Marsh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 188 days.

(21) Appl. No.: 17/643,760

(22) Filed: Dec. 10, 2021

(65) Prior Publication Data

US 2023/0186641 A1    Jun. 15, 2023

(51) Int. Cl.
| | |
|---|---|
| G06V 20/58 | (2022.01) |
| G01C 21/34 | (2006.01) |
| G06T 7/20 | (2017.01) |
| G06T 7/70 | (2017.01) |
| H04W 88/02 | (2009.01) |

(52) U.S. Cl.
CPC ......... *G06V 20/58* (2022.01); *G01C 21/3407* (2013.01); *G06T 7/20* (2013.01); *G06T 7/70* (2017.01); *G06T 2207/10016* (2013.01); *G06T 2207/10028* (2013.01); *G06T 2207/30252* (2013.01); *H04W 88/02* (2013.01)

(58) Field of Classification Search
CPC ...... G06V 20/58; G01C 21/3407; G06T 7/20; G06T 7/70; G06T 2207/10016; G06T 2207/10028; G06T 2207/30252; H04W 88/02

See application file for complete search history.

(56) References Cited

U.S. PATENT DOCUMENTS

| | | | |
|---|---|---|---|
| 2004/0230345 A1* | 11/2004 | Tzamaloukas | H04W 84/005 701/1 |
| 2011/0128902 A1* | 6/2011 | Guo | G08G 1/161 370/312 |
| 2016/0071418 A1* | 3/2016 | Oshida | B60K 28/06 701/23 |
| 2018/0141562 A1* | 5/2018 | Singhal | G01C 21/3484 |
| 2018/0160333 A1* | 6/2018 | Patil | H04W 28/0236 |
| 2018/0188045 A1* | 7/2018 | Wheeler | G06F 18/22 |
| 2019/0068582 A1* | 2/2019 | Kim | G01S 5/0072 |
| 2019/0088041 A1* | 3/2019 | Lee | H04W 4/46 |

(Continued)

*Primary Examiner* — Kira Nguyen
(74) *Attorney, Agent, or Firm* — Procopio, Cory, Hargreaves & Savitch LLP

(57) ABSTRACT

An apparatus may be configured to detect, via at least one sensor of the apparatus, a first object and to capture at least one set of reference data associated with the detected first object. The apparatus may further be configured to transmit, to at least one second wireless device, information regarding the detected first object and the at least one set of reference data associated with the detected first object. The apparatus may also be configured to receive, from another wireless device, information regarding the detected first object and at least one set of reference data associated with the detected first object and to update, based on the received information regarding the detected first object and the at least one set of reference data associated with the detected first object, at least one of the location, the motion, or the orientation of the detected first object.

30 Claims, 16 Drawing Sheets

(56) References Cited

U.S. PATENT DOCUMENTS

| | | | |
|---|---|---|---|
| 2019/0370569 A1* | 12/2019 | Gulati | G01S 13/931 |
| 2020/0074862 A1* | 3/2020 | Johnston | G08G 1/22 |
| 2020/0084278 A1* | 3/2020 | Cheng | H04W 4/44 |
| 2020/0116495 A1* | 4/2020 | Yasui | G08G 1/164 |
| 2022/0169287 A1* | 6/2022 | Beaurepaire | G01C 21/3492 |
| 2022/0210150 A1* | 6/2022 | Neubauer | H04W 4/022 |
| 2023/0107449 A1* | 4/2023 | Ong | H04W 4/022 |
| | | | 455/456.1 |

\* cited by examiner

IMAGE-COUPLED SENSOR SHARING FOR CLOUD-BASED DRIVING ASSISTANCE

TECHNICAL FIELD

The present disclosure relates generally to communication systems, and more particularly, to a sensor-sharing based driving assistance system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a first wireless device at a UE or a first UE itself. The apparatus may be configured to detect, via at least one sensor of the first UE, a first object. The apparatus may also be configured to capture at least one set of reference data associated with the detected first object. The apparatus may further be configured to transmit, to at least one second wireless device, information regarding the detected first object and the at least one set of reference data associated with the detected first object.

In an aspect of the disclosure, a method, a computer-readable medium, and an apparatus are provided. The apparatus may be a second device at a second UE or the second UE itself. The apparatus may be configured to detect, via at least one sensor of the second wireless device (e.g., the second UE), at least one of a location of a first object, a motion of the first object, or an orientation of the first object. The apparatus may also be configured to receive, from a first wireless device, information regarding the detected first object and at least one set of reference data associated with the detected first object. The apparatus may further be configured to update, based on the received information regarding the detected first object and the at least one set of reference data associated with the detected first object, at least one of the location of the detected first object, the motion of the detected first object, or the orientation of the detected first object.

In an aspect of the disclosure, a method, a computer-readable medium, and an apparatus are provided. The apparatus may be a second device at a base station (or road side unit (RSU) or a base station (or RSU) itself. The apparatus may be configured to receive, from each wireless device in a plurality of wireless devices, information regarding at least one of a location of a first object detected by a corresponding wireless device in the plurality of wireless devices, a motion of the first object, or an orientation of the first object. The apparatus may further be configured to receive, from each wireless device of the plurality of wireless devices, at least one set of reference data associated with the detected first object. The apparatus may also be configured to transmit, to a network application providing vehicle driving assistance, the information regarding at least one of the location of the first object, the motion of the first object, or the orientation of the first object received from each wireless device of the plurality of wireless devices and the at least one set of reference data associated with the detected first object received from each wireless device of the plurality of wireless devices. The apparatus may further be configured to receive, from the network application, an indication of at least one of a pedestrian alert, a vehicle alert, a road hazard, or traffic management information, where the indication is based on the transmitted information regarding the at least one of the location of the first object, the motion of the first object, or the orientation of the first object received from each wireless device of the plurality of wireless devices and the at least one set of reference data associated with the detected first object received from each wireless device of the plurality of wireless devices.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
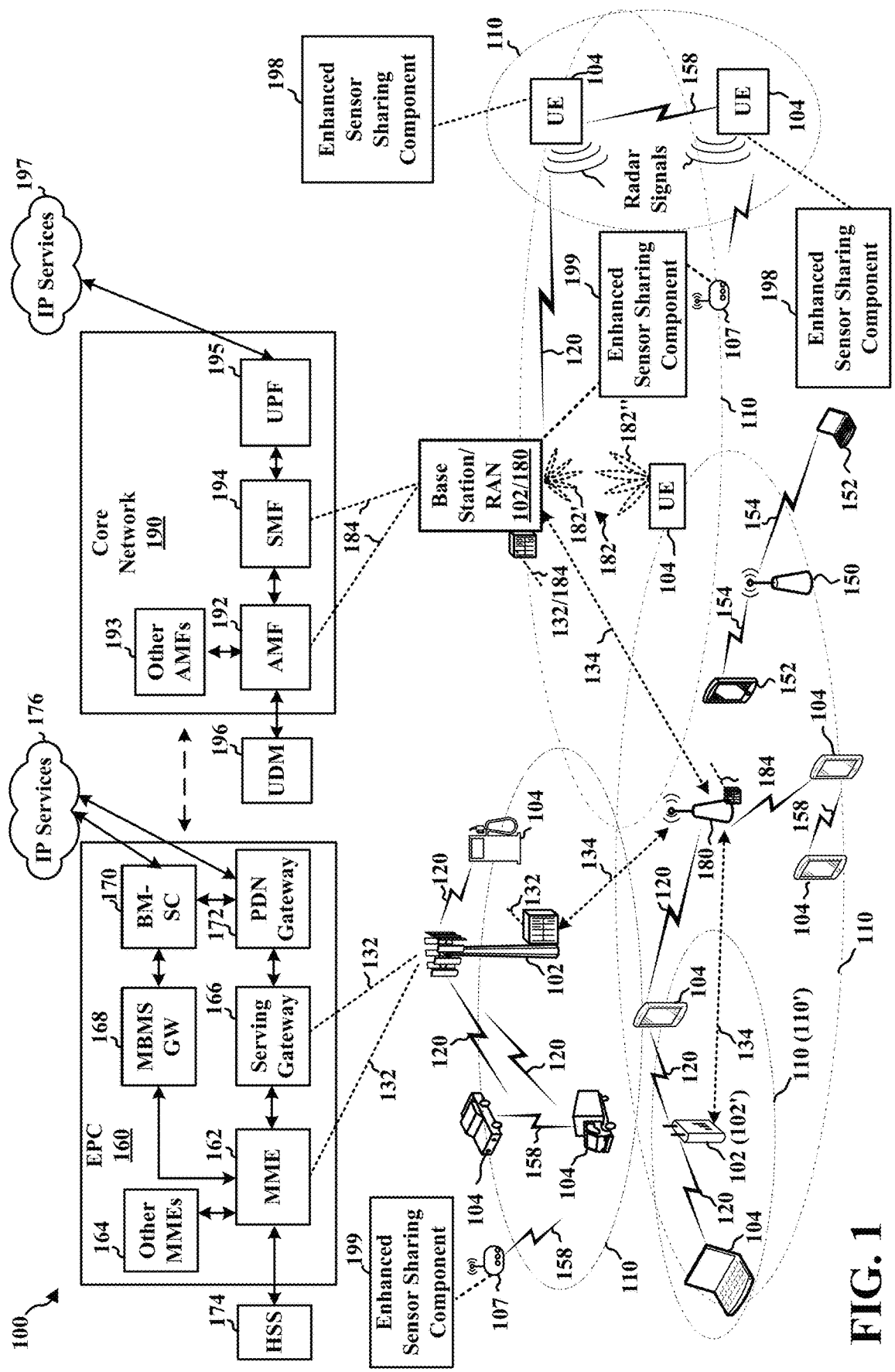
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an enhanced sensor sharing component 198 that may be configured to detect, via at least one sensor of the first UE, a first object; capture at least one set of reference data associated with the detected first object; and transmit, to at least one second wireless device, information regarding the detected first object and the at least one set of reference data associated with the detected first object. In some aspects, the enhanced sensor sharing component 198 that may be configured to detect, via at least one sensor of the second wireless device, at least one of a location of a first object, a motion of the first object, or an orientation of the first object; receive, from a first wireless device, information regarding the detected first object and at least one set of reference data associated with the detected first object; and update, based on the received information regarding the detected first object and the at least one set of reference data associated with the detected first object, at least one of the location of the detected first object, the motion of the detected first object, or the orientation of the detected first object.

In certain aspects, the base station 180 or RSU 107 may include an enhanced sensor sharing component 199 that may be configured to receive, from each wireless device in a plurality of wireless devices, information regarding at least one of a location of a first object detected by a corresponding wireless device in the plurality of wireless devices, a motion of the first object, or an orientation of the first object;

receive, from each wireless device of the plurality of wireless devices, at least one set of reference data associated with the detected first object; transmit, to a network application providing vehicle driving assistance, the information regarding at least one of the location of the first object, the motion of the first object, or the orientation of the first object received from each wireless device of the plurality of wireless devices and the at least one set of reference data associated with the detected first object received from each wireless device of the plurality of wireless devices; and receive, from the network application, an indication of at least one of a pedestrian alert, a vehicle alert, a road hazard, or traffic management information, where the indication is based on the transmitted information regarding the at least one of the location of the first object, the motion of the first object, or the orientation of the first object received from each wireless device of the plurality of wireless devices and the at least one set of reference data associated with the detected first object received from each wireless device of the plurality of wireless devices. Although the following description may be focused on 5G NR, the concepts described herein may be applicable to other similar areas, such as LTE, LTE-A, CDMA, GSM, and other wireless technologies.

Figure 2:
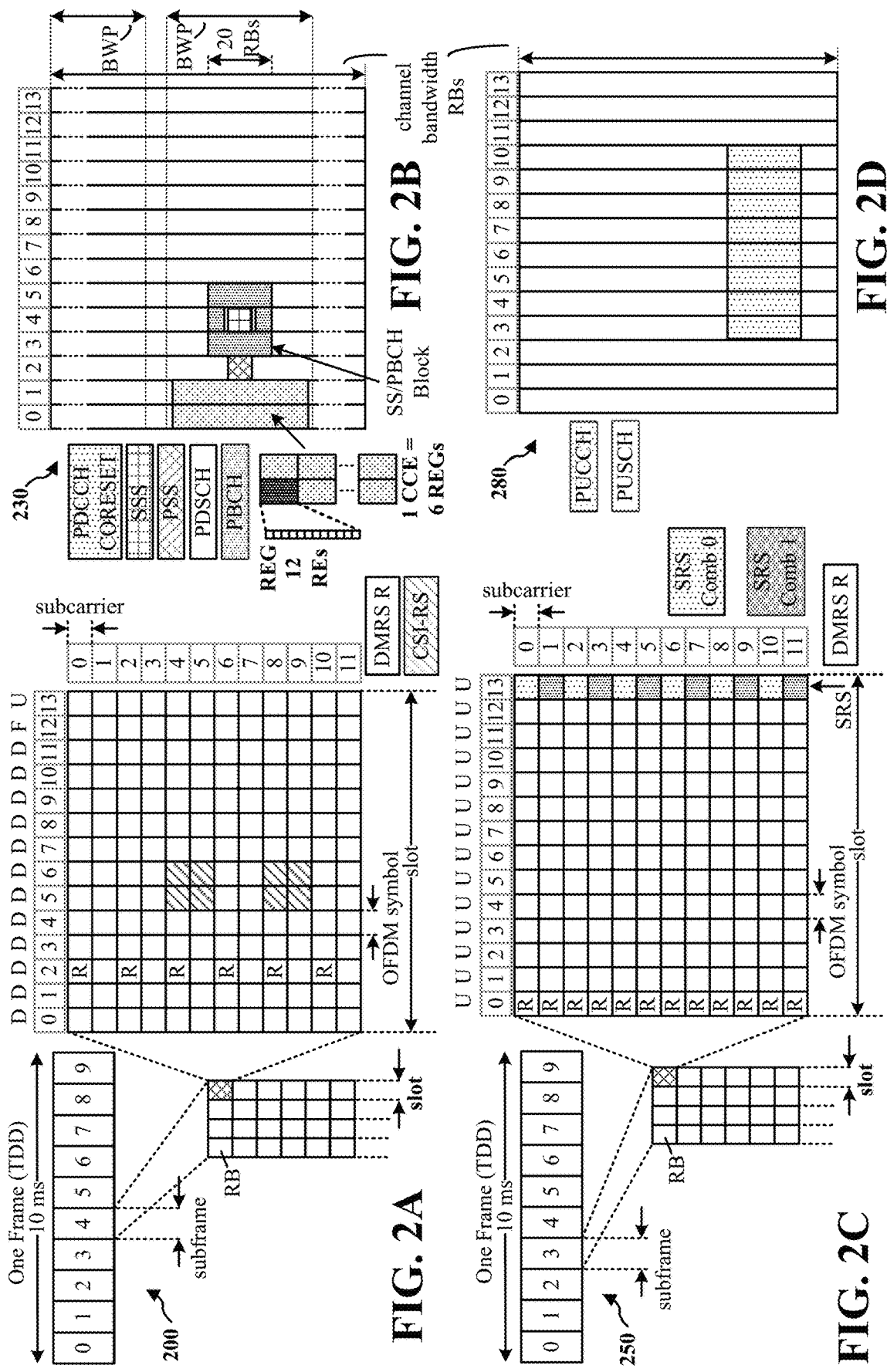
FIG. 2A is a diagram illustrating an example of a first subframe within a 5G NR frame structure.
FIG. 2B is a diagram illustrating an example of DL channels within a 5G NR subframe.
FIG. 2C is a diagram illustrating an example of a second subframe within a 5G NR frame structure.
FIG. 2D is a diagram illustrating an example of UL channels within a 5G NR subframe.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2\mu \cdot 15[\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
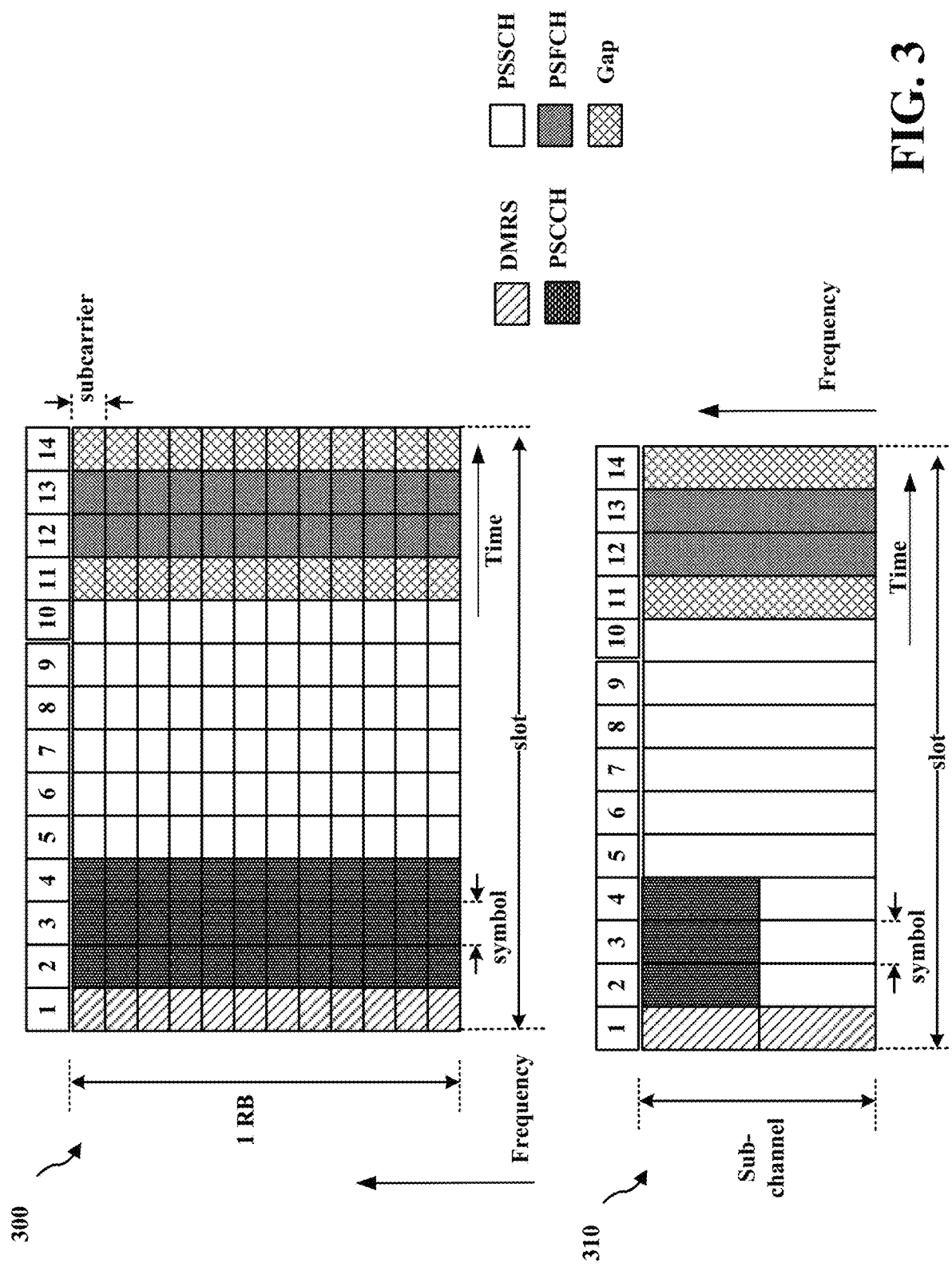
FIG. 3 includes diagrams illustrating example aspects of slot structures that may be used for sidelink communication.

FIG. 3 includes diagrams 300 and 310 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 3 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 300 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 310 in FIG. 3 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 3, some of the REs may include control information in PSCCH and some REs may include demodulation RS (DMRS). At least one symbol may be used for feedback. FIG. 3 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 3. Multiple slots may be aggregated together in some aspects.

Figure 4:
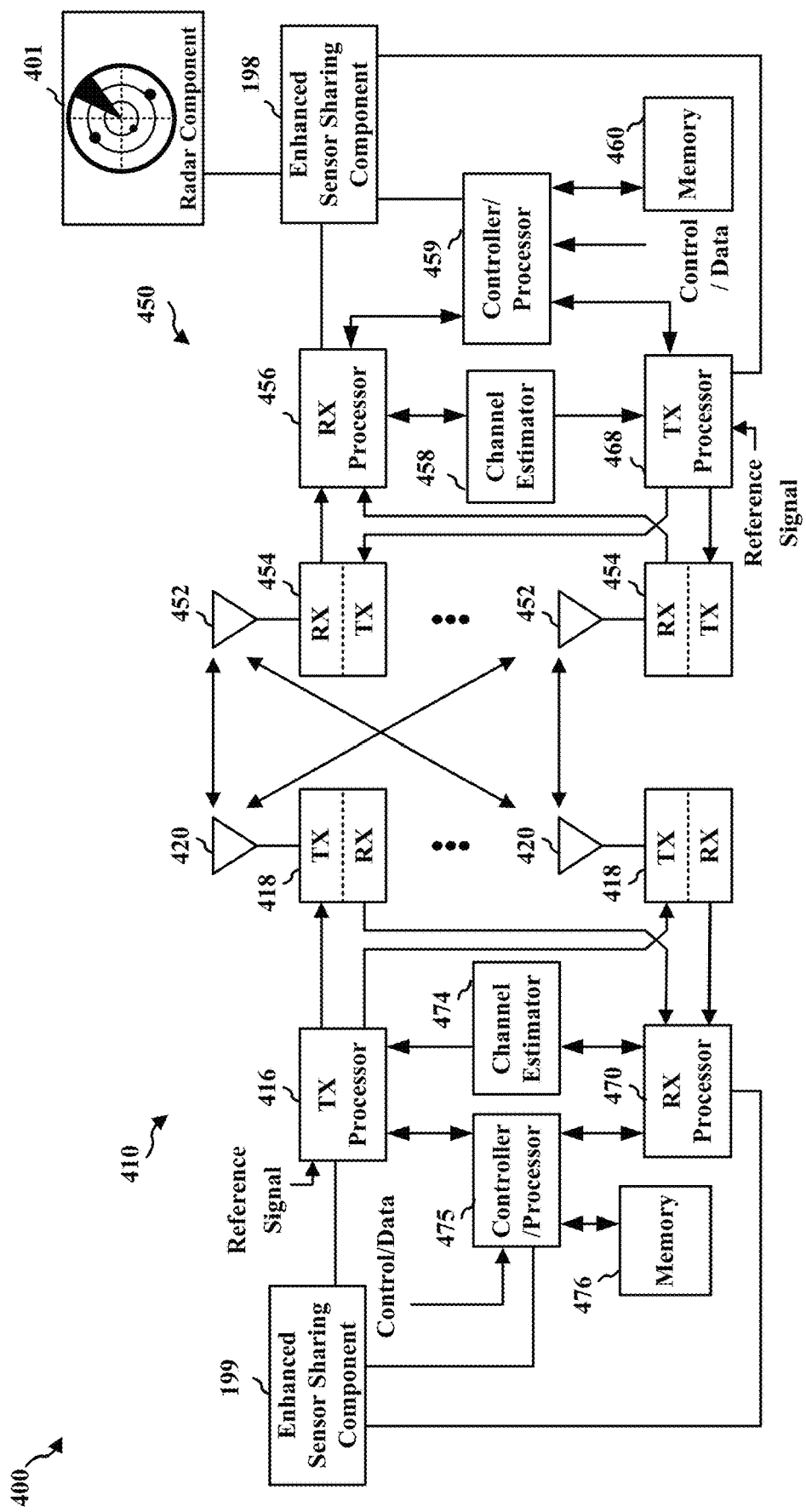
FIG. 4 is a block diagram of a base station in communication with a UE in an access network.

FIG. 4 is a block diagram of a base station 410 in communication with a UE 450 in an access network. In the DL, IP packets from the EPC 160 may be provided to a controller/processor 475. The controller/processor 475 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna 420 via a separate transmitter at RX/TX 418. Each transmitter at RX/TX 418 may modulate a radio frequency (RF) carrier with a respective spatial stream for transmission.

At the UE 450, each receiver at RX/TX 454 receives a signal through its respective antenna 452. Each receiver at RX/TX 454 recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 410. These soft decisions may be based on channel estimates computed by the channel estimator 458. The soft decisions are then decoded and deinterleaved to recover the data and control signals that were originally transmitted by the base station 410 on the physical channel. The data and control signals are then provided to the controller/processor 459, which implements layer 3 and layer 2 functionality.

The controller/processor 459 can be associated with a memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the DL transmission by the base station 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the base station 410 may be used by the TX processor 468 to select the appropriate coding and modulation schemes, and to facilitate spatial processing. The spatial streams generated by the TX processor 468 may be provided to different antenna 452 via separate transmitters at RX/TX 454. Each transmitter at RX/TX 454 may modulate an RF carrier with a respective spatial stream for transmission.

The UL transmission is processed at the base station 410 in a manner similar to that described in connection with the receiver function at the UE 450. Each receiver at RX/TX 418 receives a signal through its respective antenna 420. Each receiver at RX/TX 418 recovers information modulated onto an RF carrier and provides the information to a RX processor 470.

The controller/processor 475 can be associated with a memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover IP packets from the UE 450. IP packets from the controller/processor 475 may be provided to the EPC 160. The controller/processor 475 is also responsible for error detection using an ACK and/or NACK protocol to support HARQ operations.

Figure 5:
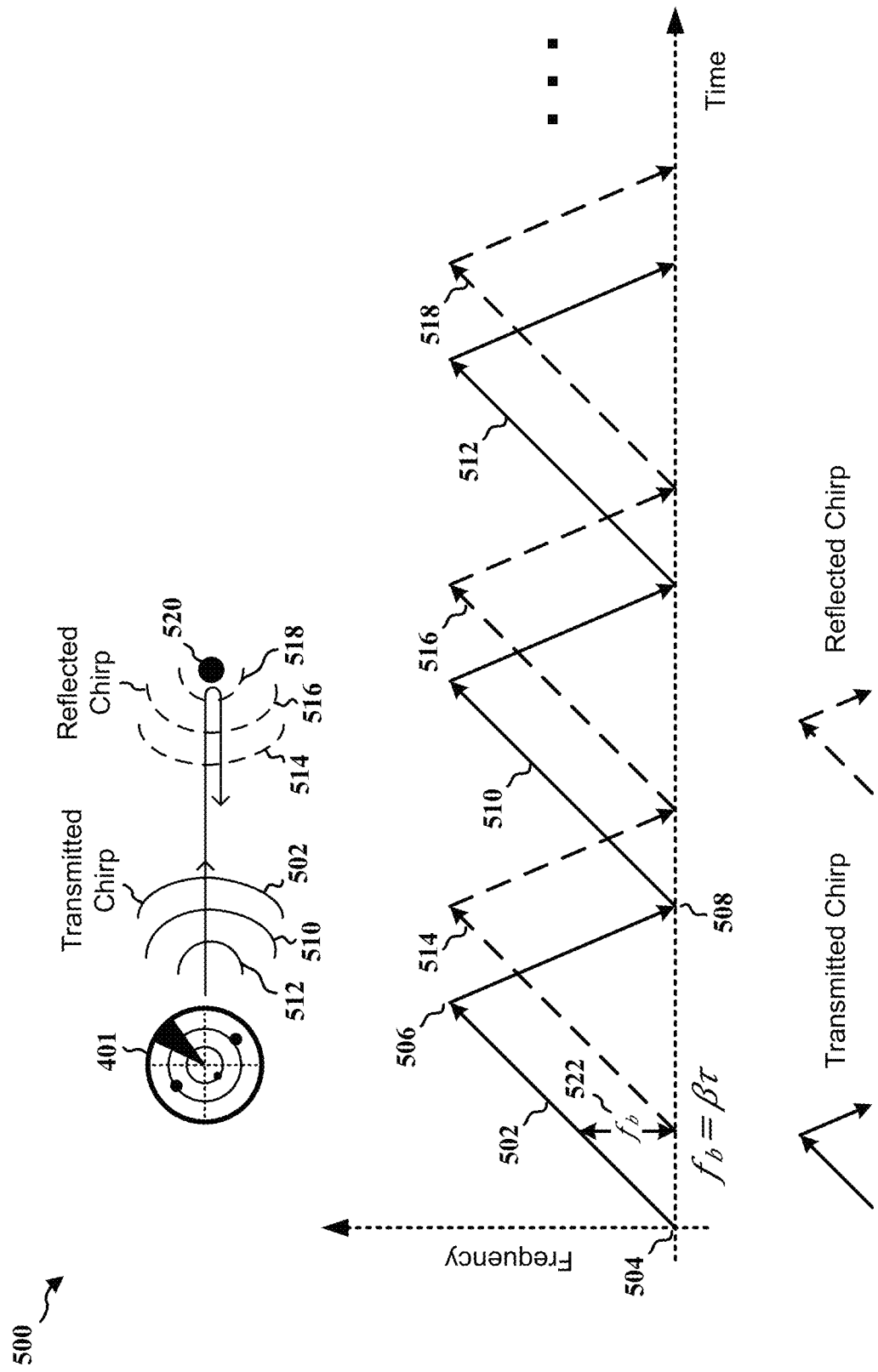
FIG. 5 is a diagram illustrating an example of frequency modulated continuous wave (FMCW) signals generated from a radar device (e.g., an FMCW radar) that may be used to measure for a beam blockage in accordance with various aspects of the present disclosure.

FIG. 5 is a diagram 500 illustrating an example of FMCW signals generated from a radar device 401 (e.g., an FMCW radar) that may be used to measure for a beam blockage in accordance with various aspects of the present disclosure. The radar device 401 may detect an object 520 by transmitting a set of radar transmissions, which may be a set of chirp signals (or may also be referred to as a pulse signals), where each of the chirp signals may have a frequency that varies linearly (e.g., have a frequency sweeping) over a fixed period of time (e.g., over a sweep time) by a modulating signal. For example, as shown by the diagram 500, a transmitted chirp 502 may have a starting frequency at 504 of a sinusoid. Then the frequency may be gradually (e.g., linearly) increased on the sinusoid until it reaches the highest frequency at 506 of the sinusoid, and then the frequency of the signal may return to 508 and another chirp 510 may be transmitted in the same way. In other words, each chirp may include an increase in the frequency (e.g., linearly) and a drop in the frequency, such that the radar device 401 may transmit chirps sweeping in frequency.

After one or more chirps (e.g., chirps 502, 510, 512, etc.) are transmitted by the radar device 401, the transmitted chirps may reach the object 520 and reflect back to the radar device 401, such as shown by the reflected chirps 514, 516, and 518, which may correspond to the transmitted chirps 502, 510, and 512, respectively. As there may be a distance between the radar device 401 and the object 520 and/or it may take time for a transmitted chirp to reach the object 520 and reflect back to the radar device 401, a delay may exist between a transmitted chirp and its corresponding reflected chirp. The delay may be proportional to a range between the radar device 401 and the object 520 (e.g., the further the target, the larger the delay and vice versa). Thus, the radar device 401 may be able to measure or estimate a distance between the radar device 401 and the object 520 based on the delay. However, in some examples, it may be difficult for some devices to measure or estimate the distance based on the delay between a transmitted chirp and a reflected chirp.

In other examples, as an alternative, the radar device 401 may measure a difference in frequency between the transmitted chirp and the reflected chirp, which may also be proportional to the distance between the radar device 401 and the object 520. In other words, as the frequency difference between the reflected chirp and the transmitted chirp increases with the delay, and the delay is linearly proportional to the range, the distance of the object 520 from the radar device 401 may also be determined based on the difference in frequency. Thus, the reflected chirp from the object may be mixed with the transmitted chirp and down-converted to produce a beat signal ($f_b$) which may be linearly proportional to the range after demodulation. For example, the radar device 401 may determine a beat signal 522 by mixing the transmitted chirp 502 and its corresponding reflected chirp 514. In some examples, a radar device may also be used to detect the velocity and direction of a using the FMCW. For example, an FMCW receiver may be able to identify the beat frequency/range based on a range spectrum. The FMCW receiver may also be able to identify the velocity based on a Doppler spectrum and/or the direction based on a direction of arrival (DoA) spectrum with multiple chirps.

At least one of the TX processor 468, the RX processor 456, and the controller/processor 459 may be configured to perform aspects in connection with enhanced sensor sharing component 198 of FIG. 1.

At least one of the TX processor 416, the RX processor 470, and the controller/processor 475 may be configured to perform aspects in connection with enhanced sensor sharing component 198 or enhanced sensor sharing component 199 of FIG. 1.

In some aspects of wireless communication, standards are defined for sensor-sharing, e.g., the exchange of information regarding detected objects/vulnerable road units (VRUs)/vehicles between vehicles, or between vehicles and infrastructure components, such as roadside units (RSUs). By collecting information from multiple vehicles, RSUs can form a more accurate picture of a driving environment in order to improve the situational awareness of vehicles. In some aspects, cloud-based entities can aggregate input from vehicles and RSUs in order to provide driving instructions and alerts to vehicles.

Figure 6:
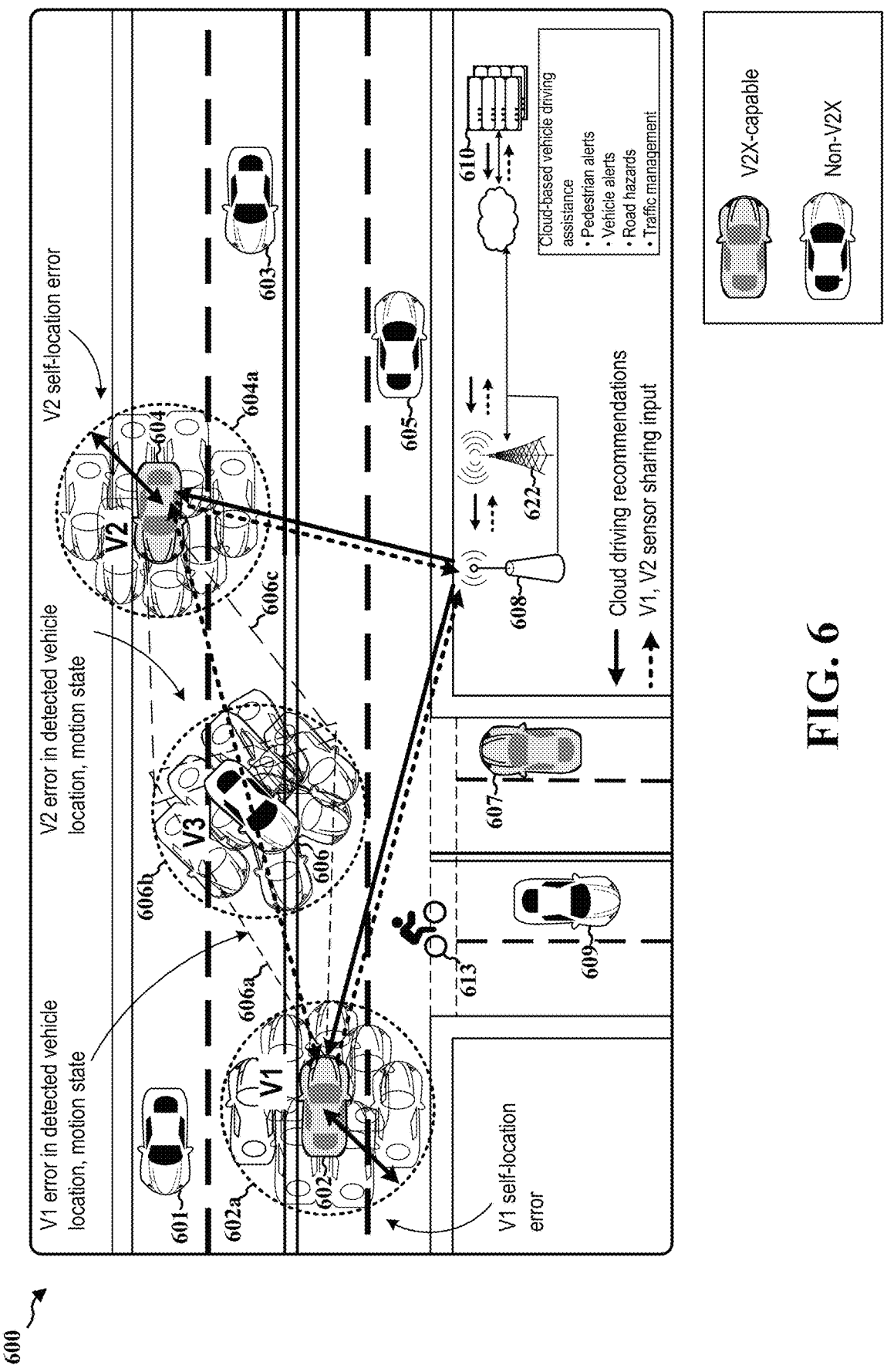
FIG. 6 is a diagram illustrating a set of vehicles and a set of network components associated with a driving assistance application.

For example, FIG. 6 is a diagram 600 illustrating a set of vehicles 601-607, 609, and 613 and a set of network components (e.g., a small-cell base station or road side unit (RSU) 608, a network application (or appliance) 610, or a base station 622) associated with a driving assistance application. The set of vehicles 601-607, 609, and 613 may include a first set of vehicles (e.g., vehicles 602, 604, and 607) that are capable of performing vehicle-to-everything (V2X) communication and a second set of vehicles (e.g., vehicles 601, 603, 605, 606, and 609) that are not capable of performing V2X communication. The first set of vehicles may engage in sensor-sharing communication with each other and/or with network elements such as an RSU or base station regarding one or more objects detected by the vehicles in the first set of vehicles. The one or more objects may include vehicles in the first and second set of vehicles, pedestrians (e.g., pedestrian/bicycle/VRU 613), road hazards, or other features of a driving environment.

Diagram 600 further illustrates that a first vehicle 602 (e.g., V1) may identify vehicle 606 (e.g., V3) within an area 606a and one of a set of orientations or motion states indicated in area 606b and may identify its own location and motion within an area 602a. The size of the area 602a may be based on an accuracy of a navigation system (e.g., a localization accuracy of the navigation system) of the vehicle 602 while the size of the area 606a may be based on an accuracy of an object detection system (e.g., including radar, image processing, lidar, etc.) associated with vehicle 602. Similarly, a second vehicle 604 (e.g., V2) may identify the same vehicle 606 (e.g., V3) within an area 606c and one of a set of orientations or motion states indicated in area 606b and may identify its own location and motion within an area 604a. The size of the area 604a may be based on an accuracy of a navigation system (e.g., a localization accuracy of the navigation system) of the vehicle 604 while the size of the area 606c may be based on an accuracy of an object detection system (e.g., including radar, image processing, lidar, etc.) associated with vehicle 604. Based on the uncertainty in the detected location and/or orientation associated with a detected object, each of the vehicles 602 and 604 may identify a same object (e.g., vehicle 606) at different locations and/or with different orientations. Each of the vehicles 602 and 604 may then transmit sensor-sharing information regarding a set of detected objects (e.g., a location, a motion, and/or an orientation associated with each detected object in the set of detected objects) to one of a small-cell base station or road side unit (RSU) 608 or a base station 622.

The small-cell base station or road side unit (RSU) 608 or the base station 622 may receive the sensor-sharing information transmitted by a plurality of vehicles (e.g., vehicles 602, 604, 607, etc.) and may transmit some or all of the received information to a network application 610. The network application 610 may be a cloud-based application (or appliance) that collects information from multiple network elements and/or devices and may also access databases of road hazards or other conditions. The network application 610 may employ artificial intelligence (AI) (e.g., neural networks, machine learning, etc.) to aggregate data in order to improve the object detection and generate pedestrian alerts, vehicle alerts, road hazards, or traffic management indications. For example, the network application 610 may receive information regarding vehicle 606 from multiple vehicles (e.g., vehicles 602 and 604) that indicate different locations, orientations, or motions associated with vehicle 606 and may identify two separate objects instead of identifying the single vehicle 606.

As described above, in some aspects, sensor sharing standards indicate reporting detected object characteristics, including location, motion state, and classification. Location and motion state may be inherently limited in accuracy due to (1) inaccuracy in the location of the vehicle (or other wireless device) detecting the object and/or (2) inaccuracy in the detection of the object's location and motion state. These errors may make it difficult for a receiver of sensor sharing messages to determine if a reported object matches an object it has detected with its own sensors, or to determine if the reported object matches a detected object reported by another vehicle (or other wireless device). While FIGS. 6-8 discuss and/or illustrate object detection in the context of vehicle-based object detection systems, non-vehicle road users (e.g., cyclists, pedestrians or other VRUs) may also detect vehicles or other non-vehicle road users and report detected objects to a network element (e.g., a small cell base station, RSU, or network application). Similar limitations may be found in reports from these non-vehicle road users as are discussed in relation to the vehicle-based object detection systems. For an RSU or cloud entity aggregating input from various sources in order to provide situational awareness and driving instructions, this ambiguity may degrade the ability to accurately interpret the environment and to provide useful guidance to vehicles.

Accordingly, a mechanism for vehicle-reported or RSU-reported sensor sharing messages to be coupled with reference data including at least of an image, a set of images, a video, a lidar point cloud, a radar point cloud and/or an ultrasound point cloud is presented herein. Associating additional information may enable a receiver of sensor sharing messages or information to associate the object described in sensor sharing messages with detections made by its own sensors and associate sensor sharing messages from multiple senders/devices. This additional information (e.g., reference data) may be included by a transmitting device in each sensor sharing information message or may be included based on a threshold accuracy of its ability to determine a detected object location and motion state.

Figure 7:
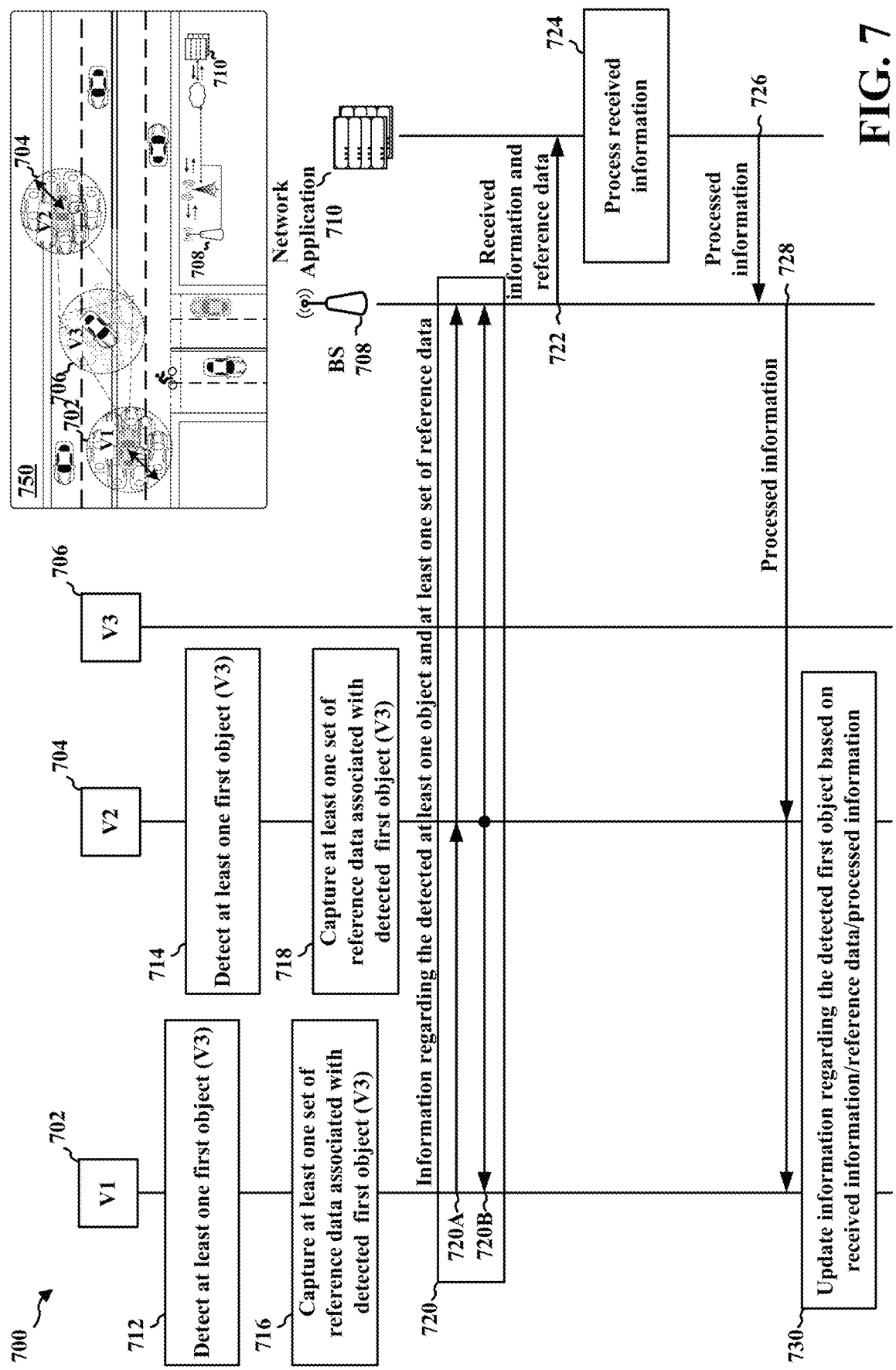
FIG. 7 is a call flow diagram illustrating a sensor sharing operation including sensor sharing messages coupled with reference data associated with a detected object.

FIG. 7 is a call flow diagram 700 illustrating a sensor sharing operation including sensor sharing messages coupled with reference data associated with a detected object. Diagram 750 illustrates an example environment in which a first vehicle (e.g., V1) 702, a second vehicle (e.g., V2) 704, a first object (e.g., vehicle V3) 706, a base station 708, and a network application 710 may operate. A first vehicle (e.g., V1) 702 may detect 712 at least a first object (e.g., V3) 706 and a second vehicle (e.g., V2) 704 may also detect at least a first object (e.g., V3) 706. The detection 712 and 714 may be based on a set of sensors associated with the first vehicle 702 and the second vehicle 704, respectively. The set of sensors may include a set of image capture devices, radar sensors, lidar sensors, ultrasound, etc. A localized computing device may integrate the information from the set of sensors to identify a set of one or more objects and to calculate, for each detected object, one or more of a location associated with the detected object, an orientation (e.g., an attitude) associated with the detected object, and motion associated with the detected object. In identifying the set of one or more objects, each of the first vehicle 702 and the second vehicle 704 may associate each detected object with an object identifier (ID).

The first vehicle 702 may additionally capture 716 (or record) at least one set of reference data (e.g., a static image, a set of images, a video, a lidar point cloud, a radar point cloud, or an ultrasound point cloud). The second vehicle 704 may also additionally capture 718 (or record) at least one set of reference data (e.g., a static image, a set of images, a video, a lidar point cloud, a radar point cloud, or an ultrasound point cloud). At 720, the first vehicle 702 may transmit, and the second vehicle 704 and the base station 708 may receive, information regarding the detected at least one object and at least one set of reference data 720A. Similarly, at 720, the second vehicle 704 may transmit, and the first vehicle 702 and the base station 708 may receive, information regarding the detected at least one object and at least one set of reference data 720B. In some aspects, the information regarding the detected at least one object and at least one set of reference data 720A and/or 720B may further include information regarding a transmitting vehicle, where the information includes at least one of a location of the transmitting vehicle, a motion of the transmitting vehicle, an orientation of the transmitting vehicle, or a planned operation of the transmitting vehicle. The information regarding the transmitting vehicle may further include a measurement of an accuracy of at least one of the location of the transmitting vehicle, the motion of the transmitting vehicle, or the orientation of the transmitting vehicle.

The information regarding the detected at least one object may include at least one of a location of the detected at least one object, a motion of the detected at least one object, an orientation (attitude) of the detected at least one object, and an object identifier (ID) associated with the detected at least one object. The at least one set of reference data may include one or more of a static image, a set of images, a video, a lidar point cloud, a radar point cloud, or an ultrasound point cloud associated with the detected at least one object. The at least one set of reference data may be associated with (or coupled to) the information regarding the detected at least one object by associating the at least one set of reference data with at least one of an object ID, a message identifier, a source identifier associated with the first vehicle, and/or a time associated with the information regarding the detected at least one object and the at least one set of reference data. In some aspects, an object ID of the detected at least one object may be associated with a set of data points of the at least one set of reference data. For example, a set of points in a lidar or radar point cloud or a set of pixels of an image or video may be associated with an object ID. The set of data points associated with the object ID may be also associated with at least one of a color associated with the detected at least one object, a bounding box of the detected at least one object, or at least one identifying feature of the detected at least one object. In some aspects, the detected at least one object is a detected first object.

The base station 708 may then transmit the received information and sets of reference data 722 from the vehicles 702 and 704 (or a portion of the received information and sets of reference data) to a network application 710. The network application 710 may be a cloud-based application or a computation device associated with the base station 708 and may include an AI system or other program for integrating information received from a plurality of vehicles and/or other devices regarding detected objects. The base station 708 may additionally perform a set of independent object detection and/or reference data capture operations (not shown) to detect at least one object and transmit the information regarding the detected at least one object and at least one set of reference data in addition to the received information and sets of reference data 722. The network application 710 may then process 724 the received information to provide situational awareness and driving instructions based on the aggregated and processed 724 data. The processed information 726 (e.g., driving instructions and/or alerts to vehicles) may then be transmitted by network application 710 and received at the base station 708. In some aspects, the network application 710 may be co-located with (e.g., be a part of) the base station 708.

The base station 708 may transmit, and the vehicles 702 and 704 may receive, processed information 728 regarding objects detected by the vehicles 702, the vehicle 704, and/or a plurality of other devices (e.g., the base station 708, additional vehicles, or an additional RSU). The processed information 728 may include any driving instructions and/or alerts to vehicles generated by the network application 710. Based on the received processed information 728, the vehicles 702 and the vehicle 704 may update information regarding the detected at least one object based on the received information and reference data 720A or 720B and processed information 728. The updated information may include an updated location of the detected at least one object, an updated motion of the detected at least one object, and/or an updated orientation (attitude) of the detected at least one object.

Figure 8:
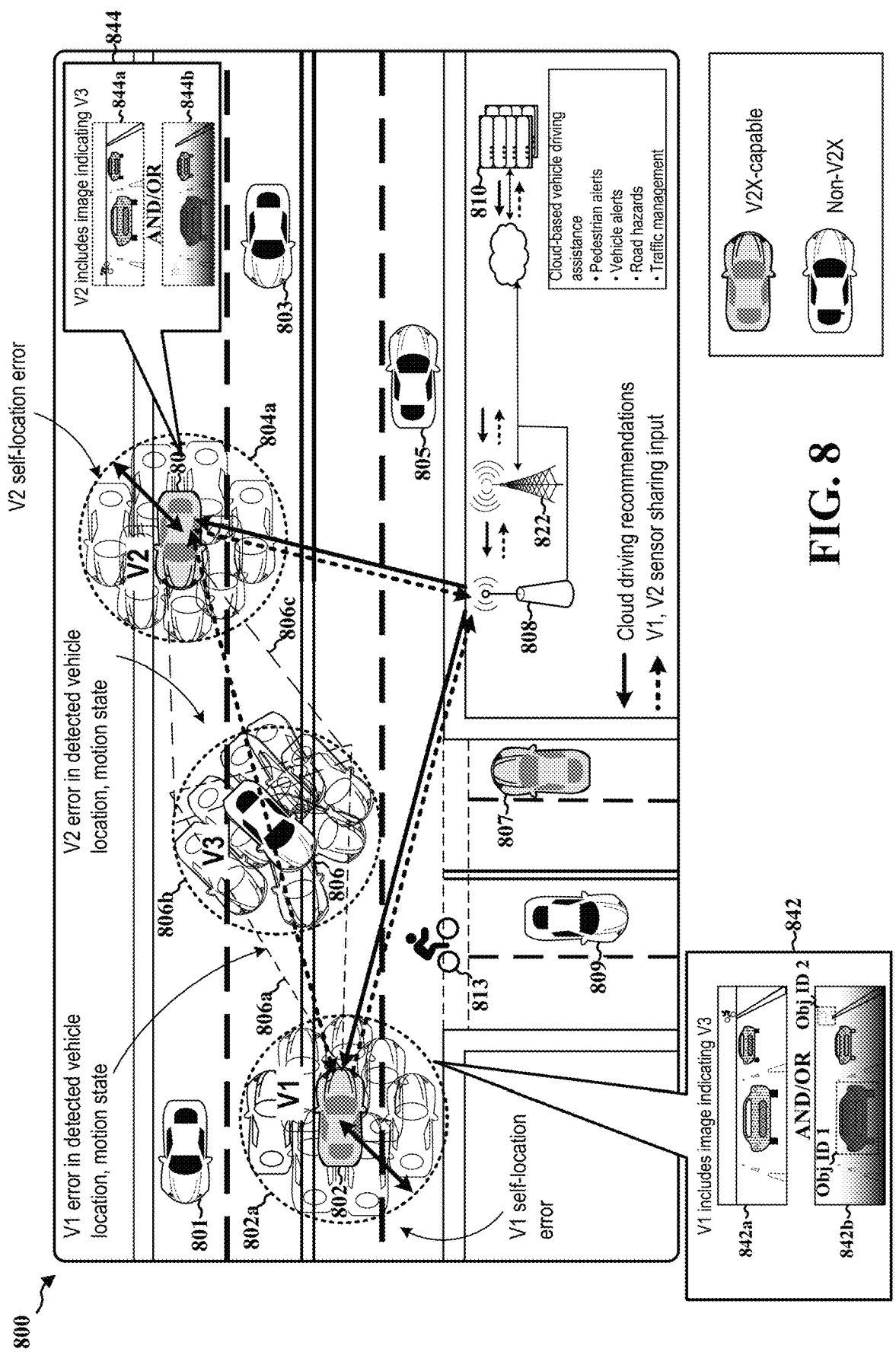
FIG. 8 is a diagram illustrating a set of vehicles and a set of network components associated with a driving assistance application.

FIG. 8 is a diagram 800 illustrating a set of vehicles 801-807, 809, and 813 and a set of network components (e.g., a small-cell base station 808 (e.g., a road side unit (RSU)), a network application 810, or a base station 822) associated with a driving assistance application. The set of vehicles 801-807, 809, and 813 may include a first set of vehicles (e.g., vehicles 802, 804, and 807) that are capable of performing vehicle-to-everything (V2X) communication and a second set of vehicles (e.g., vehicles 801, 803, 805, 806, and 809) that is not capable of performing V2X communication. The first set of vehicles may engage in sensor-sharing communication with each other and/or with network elements such as an RSU or base station regarding one or more objects detected by the vehicles in the first set of vehicles. The one or more objects may include vehicles in the first and second set of vehicles, pedestrians (e.g., pedestrian/bicycle/VRU 813), road hazards, or other features of a driving environment. Diagram 800 is similar to diagram 600 of FIG. 6, but illustrates that vehicle 802 and vehicle 804 additionally transmit reference data 842 and 844 respectively. The reference data 842 or 844 may include, e.g., image data 842a or 844a or a radar/lidar point cloud 842b or 844b or other type of reference data. For simplicity, just radar/lidar point cloud 842b is illustrated associating a first set of pixels (e.g., a set of pixels or data points in a first bounding box) with a first object ID (e.g., Obj ID 1) and a second set of pixels (e.g., a set of pixels or data points in a second bounding box) with a second object ID (e.g., Obj ID 2), but other reference data may include similar associations between sets of data points and object IDs.

Diagram 800 further illustrates that a first vehicle 802 (e.g., V1) may identify vehicle 806 (e.g., V3) within an area 806a and one of a set of orientations or motion states indicated in area 806b and may identify its own location and motion within an area 802a. The size of the area 802a may be based on an accuracy of a navigation system (e.g., a localization accuracy of the navigation system) of the vehicle 802 while the size of the area 806a may be based on an accuracy of an object detection system (e.g., including radar, image processing, lidar, etc.) associated with vehicle 802. The first vehicle 802 may capture a set of reference data 842, e.g., image data 842a, a set of images, a video, or a point cloud 842b (e.g., a lidar point cloud, a radar point cloud, or an ultrasound point cloud), as described in relation to capturing 716 at least one set of reference data.

Similarly, a second vehicle 804 (e.g., V2) may identify the same vehicle 806 (e.g., V3) within an area 806c and one of a set of orientations or motion states indicated in area 806b may identify its own location and motion within an area 804a. The size of the area 804a may be based on an accuracy of a navigation system (e.g., a localization accuracy of the navigation system) of the vehicle 804 while the size of the area 806c may be based on an accuracy of an object detection system (e.g., including radar, image processing, lidar, etc.) associated with vehicle 804. The second vehicle 804 may capture a set of reference data 844, e.g., a static image, a set of images, a video, a lidar point cloud, a radar point cloud, or an ultrasound point cloud, as described in relation to capturing 718 at least one set of reference data. Based on the uncertainty in the detected location and/or orientation associated with a detected object, each of the vehicles 802 and 804 may identify a same object (e.g., vehicle 806) at different locations and/or with different orientations. Each of the vehicles 802 and 804 may then transmit sensor-sharing information regarding a set of detected objects (e.g., a location, a motion, and/or an orientation associated with the set of detected objects) as well as the reference data 842 and 844, respectively, to one of a small-cell base station 808 (e.g., an RSU) or a base station 822.

The small-cell base station 808 or the base station 822 may receive the sensor-sharing information and reference data 842 and 844 transmitted by a plurality of vehicles (e.g., vehicles 802, 804, 807, etc.) and may transmit some or all of the received information and reference data 842 and 844 to a network application 810. The network application 810 may be a cloud-based application (or appliance) that collects information from multiple network elements and/or devices and may also access databases of road hazards or other conditions. The network application 810 may employ AI (e.g., neural networks, machine learning, etc.) to aggregate received data in order to improve the object detection and generate pedestrian alerts, vehicle alerts, road hazards, or traffic management indications. For example, the network application 810 may receive information regarding vehicle 806 from multiple vehicles (e.g., vehicles 802 and 804) that indicate different locations, orientations, or motions associated with vehicle 806 but also receives reference data (e.g., reference data 842 and/or 844) from the plurality of devices (e.g., vehicles, small cell base stations, or RSUs). The reference data (e.g., reference data 842 and/or 844) may allow the network application to aggregate data indicating different detected locations, orientations, or motions for a same physical object detected at different devices to identify a single detected object corresponding to the physical object. For example, reference data (e.g., an image or radar/lidar point cloud) may indicate a first number of objects such that it is inconsistent to identify different objects based on information regarding a same detected physical object received from the plurality of devices (e.g., vehicles 802 and 804, small cell base station 808). In some aspects, a license plate number associated with objects identified by one or more different vehicles may be used to identify that the identified objects correspond to a same physical object.

The network application 810 may then transmit cloud-based driving assistance information including one or more of pedestrian alerts, vehicle alerts, road hazards, or traffic management to the base station 822 or the small cell base station 808. The network application 810 may also transmit updated object identification information for a particular detected object. The updated object identification information may include an object ID, a message identifier, a source identifier associated with a particular vehicle, and/or a time associated with a location of the particular detected object, a motion of the detected at least one object, an orientation (attitude) of the detected at least one object. The devices (e.g., the vehicles 802 and 804 or the small cell base station 808) receiving the updated object identification information may update local object data based on the received updated object identification information.

Figure 9:
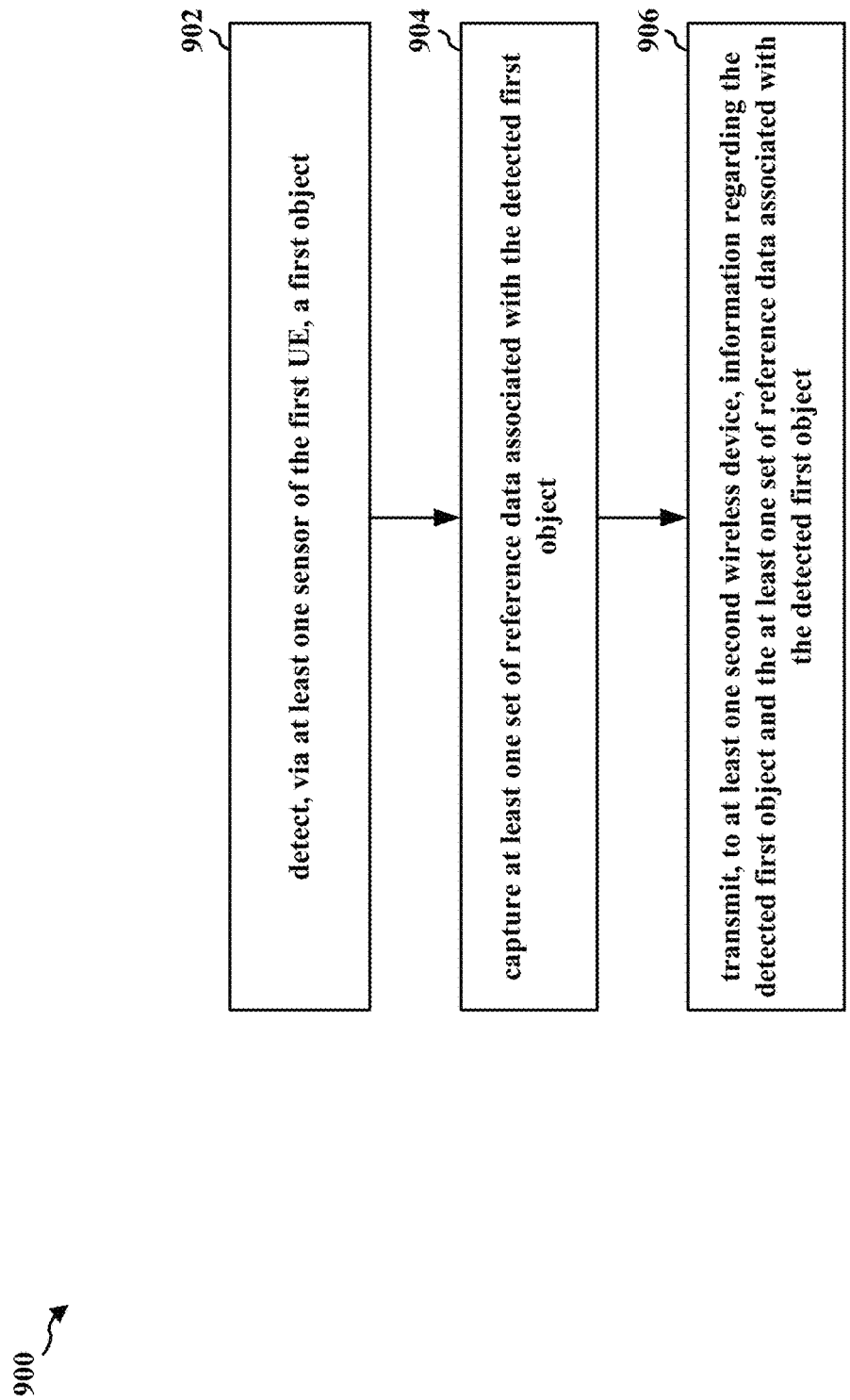
FIG. 9 is a flowchart of a method of wireless communication.

FIG. 9 is a flowchart 900 of a method of wireless communication. The method may be performed by a first UE or vehicle (e.g., the UE 104; the vehicle 702 or 802; the apparatus 1502). At 902, the first UE or vehicle may detect, via at least one sensor of the first UE, a first object. For example, 902 may be performed by an object detection component 1540. The at least one sensor may include a set of image capture devices, radar sensors, lidar sensors, ultrasound, etc. A localized computing device may integrate the information from the set of sensors to detect (or identify) the first object and to calculate, for the first object, one or more of a location associated with the detected first object, an orientation (e.g., an attitude) associated with the detected first object, a motion associated with the detected first object, and may assign an object ID. For example, referring to FIGS. 7 and 8, a first vehicle 702 or 802 may detect 712 a third vehicle 706 or 806.

At 904, the first UE or vehicle may capture at least one set of reference data associated with the detected first object. For example, 904 may be performed by an enhanced sensor sharing component 1542. In some aspects, the at least one set of reference data associated with the detected first object may be at least one of a static image, a set of images, a video, a radar point cloud, a lidar point cloud, or an ultrasound point cloud. The captured at least one set of reference data, in some aspects, is associated with at least one of the object ID, a message ID, a source ID associated with the first UE or vehicle, or a time associated with the at least one set of reference data. In some aspects, associating the at least one set of reference data with the object ID includes associating the object ID with a set of data points of the at least one set of reference data. The set of data points may be associated with at least one of a color associated with the detected first object, a bounding box of the detected first object, or at least one identifying feature of the detected first object. For example, referring to FIGS. 7 and 8, a first vehicle 702 or 802 may capture 716 at least one set of reference data associated with the detected third vehicle 706 or 806.

Finally, at 906, the first UE or vehicle may transmit, and at least one second wireless device (e.g., vehicle 704 or 804 or base station 708 or 808) may receive, information regarding the detected first object and the at least one set of reference data associated with the detected first object. For example, 906 may be performed by an enhanced sensor sharing component 1542. In some aspects, the first UE or vehicle may also transmit information regarding the first UE or vehicle, where the information may include at least one of a location of the first UE or vehicle, a motion of the first UE or vehicle, an orientation of the first UE or vehicle, or a planned operation of the first UE or vehicle. The information regarding the first UE or vehicle may further include a measurement of an accuracy of at least one of the location of the first UE or vehicle, the motion of the first UE or vehicle, or the orientation of the first UE or vehicle. For example, referring to FIGS. 7 and 8, the vehicle 702 or 802 may transmit, and the second vehicle 704 or 804 and the base station 708 or 808 may receive, information regarding the detected first object and the at least one set of reference data 720A.

Figure 10:
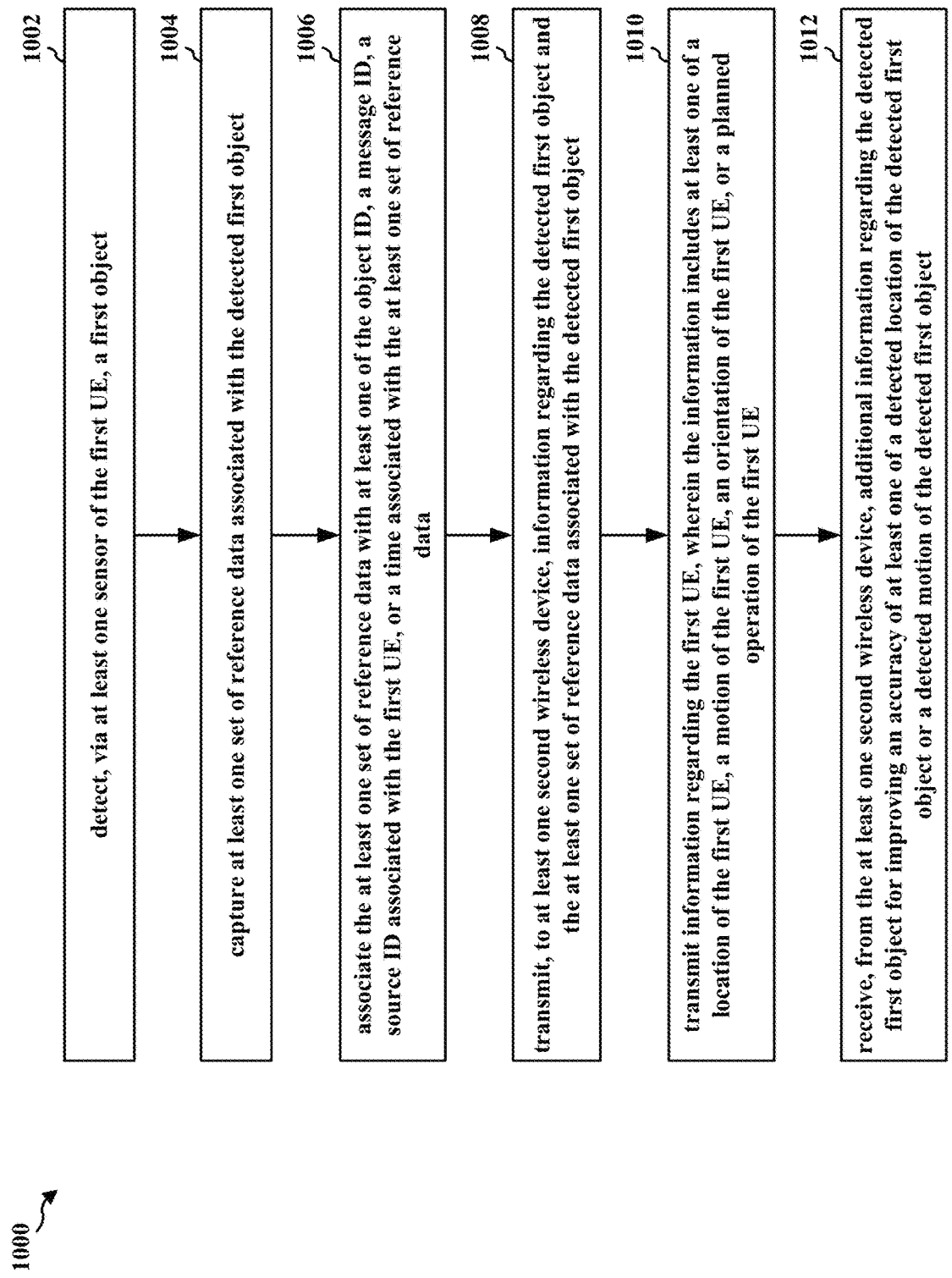
FIG. 10 is a flowchart of a method of wireless communication.

FIG. 10 is a flowchart 1000 of a method of wireless communication. The method may be performed by a first UE or vehicle (e.g., the UE 104; the vehicle 702 or 802; the apparatus 1502). At 1002, the first UE or vehicle may detect, via at least one sensor of the first UE, a first object. For example, 1002 may be performed by an object detection component 1540. The at least one sensor may include a set of image capture devices, radar sensors, lidar sensors, ultrasound, etc. A localized computing device may integrate the information from the set of sensors to detect (or identify) the first object and to calculate, for the first object, one or more of a location associated with the detected first object, an orientation (e.g., an attitude) associated with the detected first object, a motion associated with the detected first object, and an object ID. For example, referring to FIGS. 7 and 8, a first vehicle 702 or 802 may detect 712 a third vehicle 706 or 806.

At 1004, the first UE or vehicle may capture at least one set of reference data associated with the detected first object. For example, 1004 may be performed by an enhanced sensor sharing component 1542. In some aspects, the at least one set of reference data associated with the detected first object may be at least one of a static image, a set of images, a video, a radar point cloud, a lidar point cloud, or an ultrasound point cloud. For example, referring to FIGS. 7 and 8, a first vehicle 702 or 802 may capture 716 at least one set of reference data associated with the detected third vehicle 706 or 806.

At 1006, the first UE or vehicle may associate the captured at least one set of reference data with at least one of the object ID, a message ID, a source ID associated with the first UE or vehicle, or a time associated with the detected first object. For example, 1006 may be performed by an enhanced sensor sharing component 1542. In some aspects, associating the at least one set of reference data with the object ID includes associating the object ID with a set of data points of the at least one set of reference data. The set of data points may be associated with at least one of a color associated with the detected first object, a bounding box of the detected first object, or at least one identifying feature of the detected first object. For example, referring to FIGS. 7 and 8, a first vehicle 702 or 802 may capture 716 at least one set of reference data 842 associated with the detected third vehicle 706 or 806 and associate the captured 716 set of reference data 842 with the information regarding the detected first object for transmitting 720, e.g., by associating object ID 1 with the indicated area of radar/lidar point cloud 842b.

At 1008, the first UE or vehicle may transmit, and at least one second wireless device (e.g., vehicle 704 or 804 or base station 708 or 808) may receive, information regarding the detected first object and the at least one set of reference data associated with the detected first object. For example, 1008 may be performed by an enhanced sensor sharing component 1542. For example, referring to FIGS. 7 and 8, the vehicle 702 or 802 may transmit, and the second vehicle 704 or 804 and the base station 708 or 808 may receive, information regarding the detected first object and the at least one set of reference data 720A.

At 1010, the first UE or vehicle, may transmit, and at least one second wireless device (e.g., vehicle 704 or 804 or base station 708 or 808) may receive, information regarding the first UE or vehicle, where the information may include at least one of a location of the first UE or vehicle, a motion of the first UE or vehicle, an orientation of the first UE or vehicle, or a planned operation of the first UE or vehicle. For example, 1010 may be performed by an enhanced sensor sharing component 1542. The information regarding the first UE or vehicle may further include a measurement of an accuracy of at least one of the location of the first UE or vehicle, the motion of the first UE or vehicle, or the orientation of the first UE or vehicle. For example, referring to FIGS. 7 and 8, the vehicle 702 or 802 may transmit, and the second vehicle 704 or 804 and the base station 708 or 808 may receive, information regarding the detected first object and the at least one set of reference data 720A including the information regarding the first UE or vehicle.

Finally, at 1012, the first UE or vehicle may receive, from the at least one second wireless device (e.g., vehicle 704 or 804 or base station 708 or 808), additional information regarding the detected first object for improving an accuracy of at least one of a detected location of the detected first object or a detected motion of the detected first object. For example, 1012 may be performed by an enhanced sensor sharing component 1542. The additional information may then be used to update information regarding the detected first object. For example, referring to FIGS. 7 and 8, the vehicle 702 or 802 may receive information regarding the detected at least one object and at least one set of reference data 720A from a second vehicle 704 or 804 and/or processed information 728 from a base station 708 or 808 and may update 730 the information regarding the detected first object.

Figure 11:
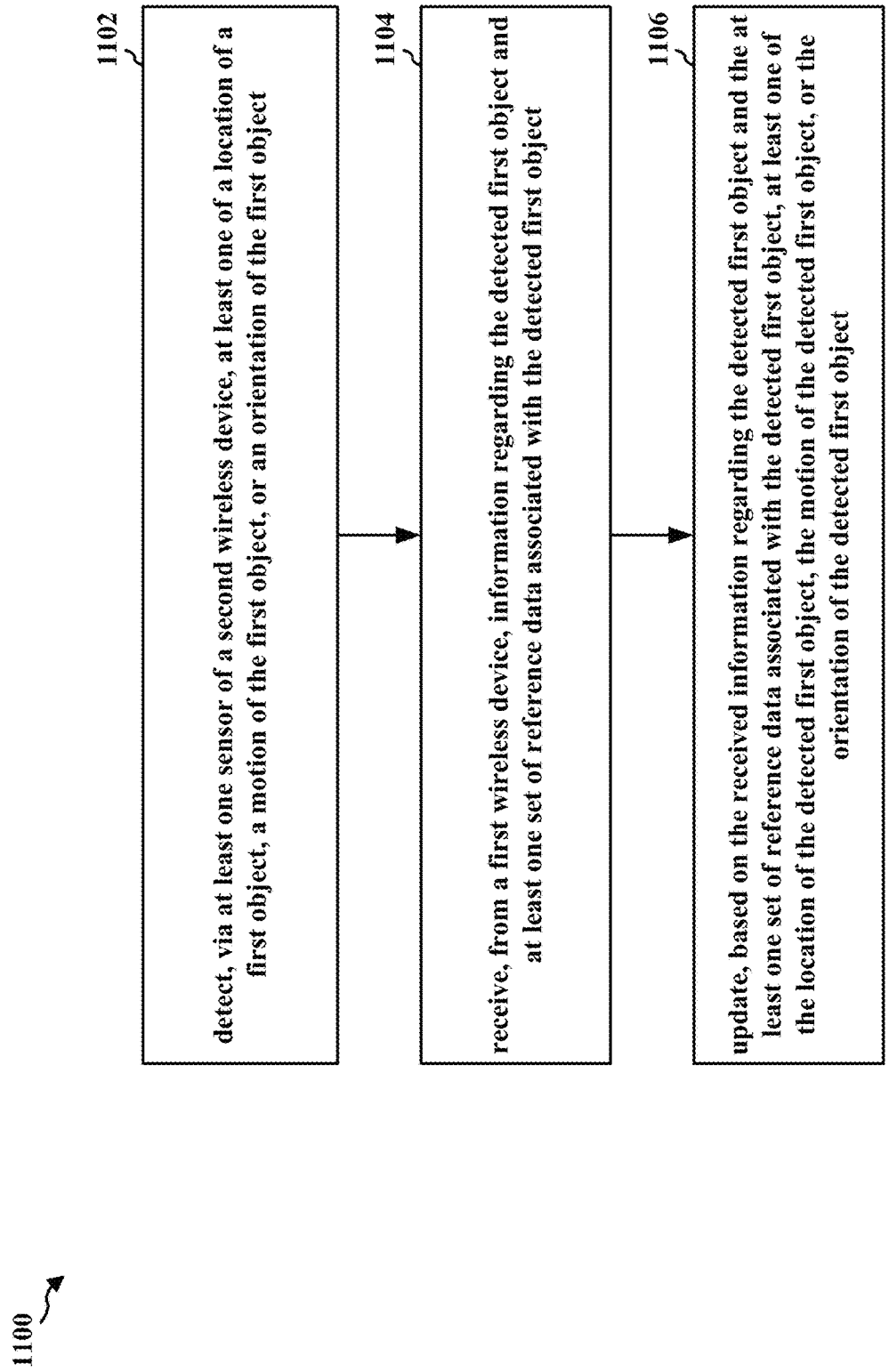
FIG. 11 is a flowchart of a method of wireless communication.

FIG. 11 is a flowchart 1100 of a method of wireless communication. The method may be performed by a second wireless device, a second vehicle, a base station, or an RSU (e.g., the UE 104; the vehicle 704 or 804; the base station 102/180, 708, 808, or 822; the RSU 107; the apparatus 1502 or 1602). At 1102, the second UE or vehicle may detect, via at least one sensor of the second UE, at least one of a location of a first object, a motion of the first object, or an orientation of the first object. For example, 1102 may be performed by an object detection component 1540 or 1640. The at least one sensor may include a set of image capture devices, radar sensors, lidar sensors, ultrasound, etc. A localized computing device may integrate the information from the set of sensors to detect (or identify) the first object and to calculate, for the first object, one or more of a location associated with the detected first object, an orientation (e.g., an attitude) associated with the detected first object, a motion associated with the detected first object, and an object ID. For example, referring to FIGS. 7 and 8, a second vehicle 704 or 804 may detect 718 a third vehicle 706 or 806.

At 1104, the second wireless device, second vehicle, base station, or RSU may receive, from a first wireless device (e.g., vehicle 702 or 802 or base station 708 or 808), information regarding the detected first object and at least one set of reference data associated with the detected first object. For example, 1104 may be performed by an enhanced sensor sharing component 1542 or 1642. In some aspects, the at least one set of reference data associated with the detected first object may be at least one of a static image, a set of images, a video, a radar point cloud, a lidar point cloud, or an ultrasound point cloud. The at least one set of reference data, in some aspects, is associated with at least one of the object ID, a message ID, a source ID associated with the first wireless device, or a time associated with the detected first object. In some aspects, the at least one set of reference data includes an association between the object ID with a set of data points of the at least one set of reference data. The set of data points may be associated with at least one of a color associated with the detected first object, a bounding box of the detected first object, or at least one identifying feature of the detected first object. For example, referring to FIGS. 7 and 8, the vehicle 704 or 804 may receive information regarding the detected at least one object and at least one set of reference data 720A from a first vehicle 702 or 802 and/or processed information 728 from a base station 708 or 808.

At 1106, the second wireless device, second vehicle, base station, or RSU may update, based on the received information regarding the detected first object and the at least one set of reference data associated with the detected first object, at least one of the location of the detected first object, the motion of the detected first object, or the orientation of the detected first object. For example, 1106 may be performed by an enhanced sensor sharing component 1542 or 1642. For example, referring to FIGS. 7 and 8, the vehicle 704 or 804 may receive information regarding the detected at least one object and at least one set of reference data 720A from a first vehicle 702 or 802 and/or processed information 728 from a base station 708 or 808 and may update 730 the information regarding the detected first object.

Figure 12:
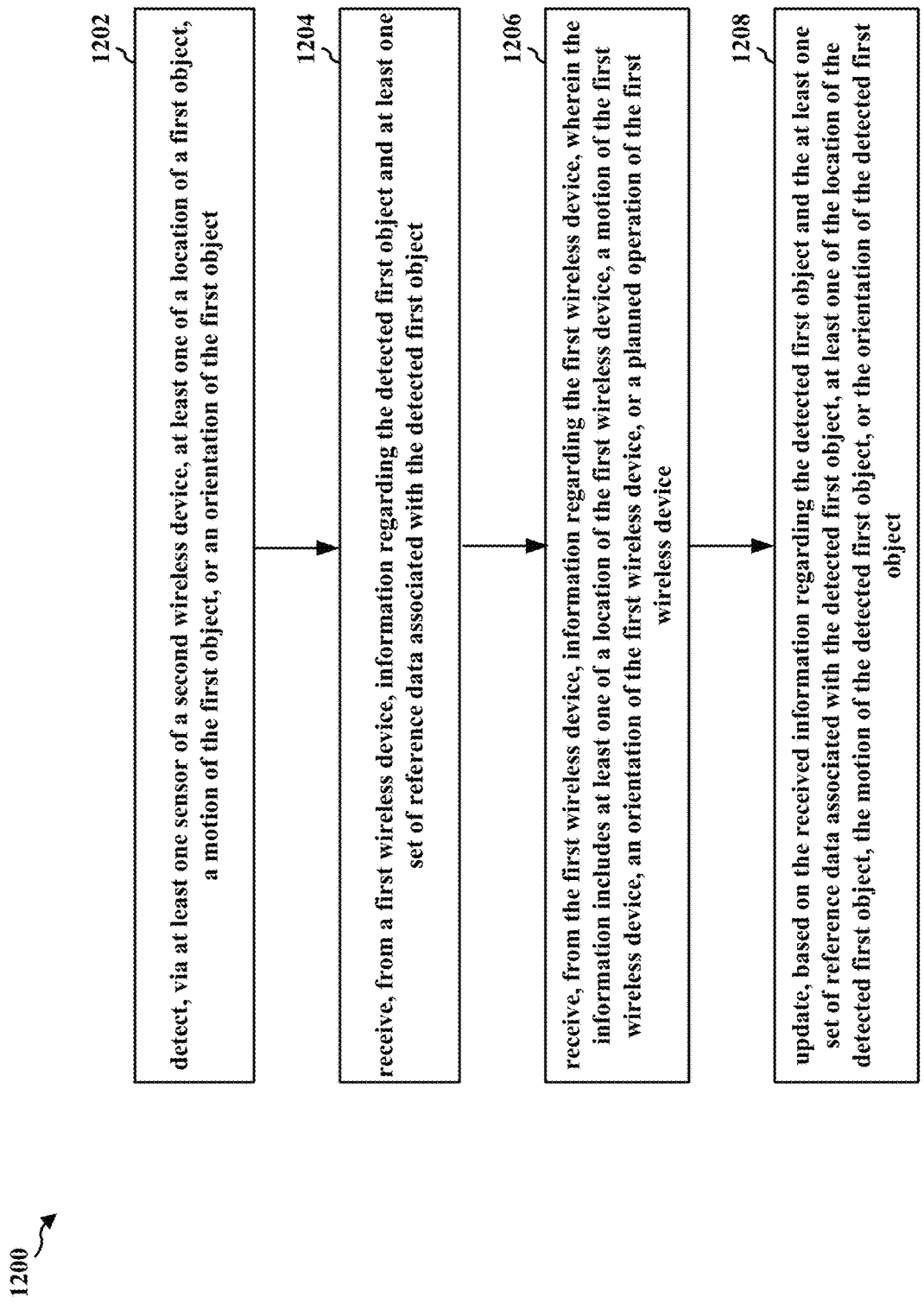
FIG. 12 is a flowchart of a method of wireless communication.

FIG. 12 is a flowchart 1200 of a method of wireless communication. The method may be performed by a second wireless device, a second vehicle, a base station, or an RSU (e.g., the UE 104; the vehicle 704 or 804; the base station 102/180, 708, 808, or 822; the RSU 107; the apparatus 1502 or 1602). At 1202, the second UE or vehicle may detect, via at least one sensor of the second UE, at least one of a location of a first object, a motion of the first object, or an orientation of the first object. For example, 1202 may be performed by an object detection component 1540 or 1640. The at least one sensor may include a set of image capture devices, radar sensors, lidar sensors, ultrasound, etc. A localized computing device may integrate the information from the set of sensors to detect (or identify) the first object and to calculate, for the first object, one or more of a location associated with the detected first object, an orientation (e.g., an attitude) associated with the detected first object, a motion associated with the detected first object, and an object ID. For example, referring to FIGS. 7 and 8, a second vehicle 704 or 804 may detect 718 a third vehicle 706 or 806.

At 1204, the second wireless device, second vehicle, base station, or RSU may receive, from a first wireless device (e.g., vehicle 702 or 802 or base station 708 or 808), information regarding the detected first object and at least one set of reference data associated with the detected first object. For example, 1204 may be performed by an enhanced sensor sharing component 1542 or 1642. In some aspects, the at least one set of reference data associated with the detected first object may be at least one of a static image, a set of images, a video, a radar point cloud, a lidar point cloud, or an ultrasound point cloud. The at least one set of reference data, in some aspects, is associated with at least one of the object ID, a message ID, a source ID associated with the first wireless device, or a time associated with the detected first object. In some aspects, the at least one set of reference data includes an association between the object ID with a set of data points of the at least one set of reference data. The set of data points may be associated with at least one of a color associated with the detected first object, a bounding box of the detected first object, or at least one identifying feature of the detected first object. For example, referring to FIGS. 7 and 8, the vehicle 704 or 804 may receive information regarding the detected at least one object and at least one set of reference data 720A from a first vehicle 702 or 802 and/or processed information 728 from a base station 708 or 808.

At 1206, the second wireless device, second vehicle, base station, or RSU may receive, from a first wireless device (e.g., vehicle 702 or 802 or base station 708 or 808), information regarding the first wireless device, where the information may include at least one of a location of the first wireless device, a motion of the first wireless device, an orientation of the first wireless device, or a planned operation of the first wireless device. For example, 1206 may be performed by an enhanced sensor sharing component 1542 or 1642. The information regarding the first wireless device may further include a measurement of an accuracy of at least one of the location of the first wireless device, the motion of the first wireless device, or the orientation of the first wireless device. For example, referring to FIGS. 7 and 8, the vehicle 704 or 804 may receive, from the first vehicle 704 or 804 information regarding the first wireless device that may be included in information regarding the detected first object and the at least one set of reference data 720A.

Finally, at 1208, the second wireless device, second vehicle, base station, or RSU may update, based on the received information regarding the detected first object and the at least one set of reference data associated with the detected first object, at least one of the location of the detected first object, the motion of the detected first object, or the orientation of the detected first object. For example, 1208 may be performed by an enhanced sensor sharing component 1542 or 1642. For example, referring to FIGS. 7 and 8, the vehicle 704 or 804 may receive information regarding the detected at least one object and at least one set of reference data 720A from a first vehicle 702 or 802 and/or processed information 728 from a base station 708 or 808 and may update 730 the information regarding the detected first object.

Figure 13:
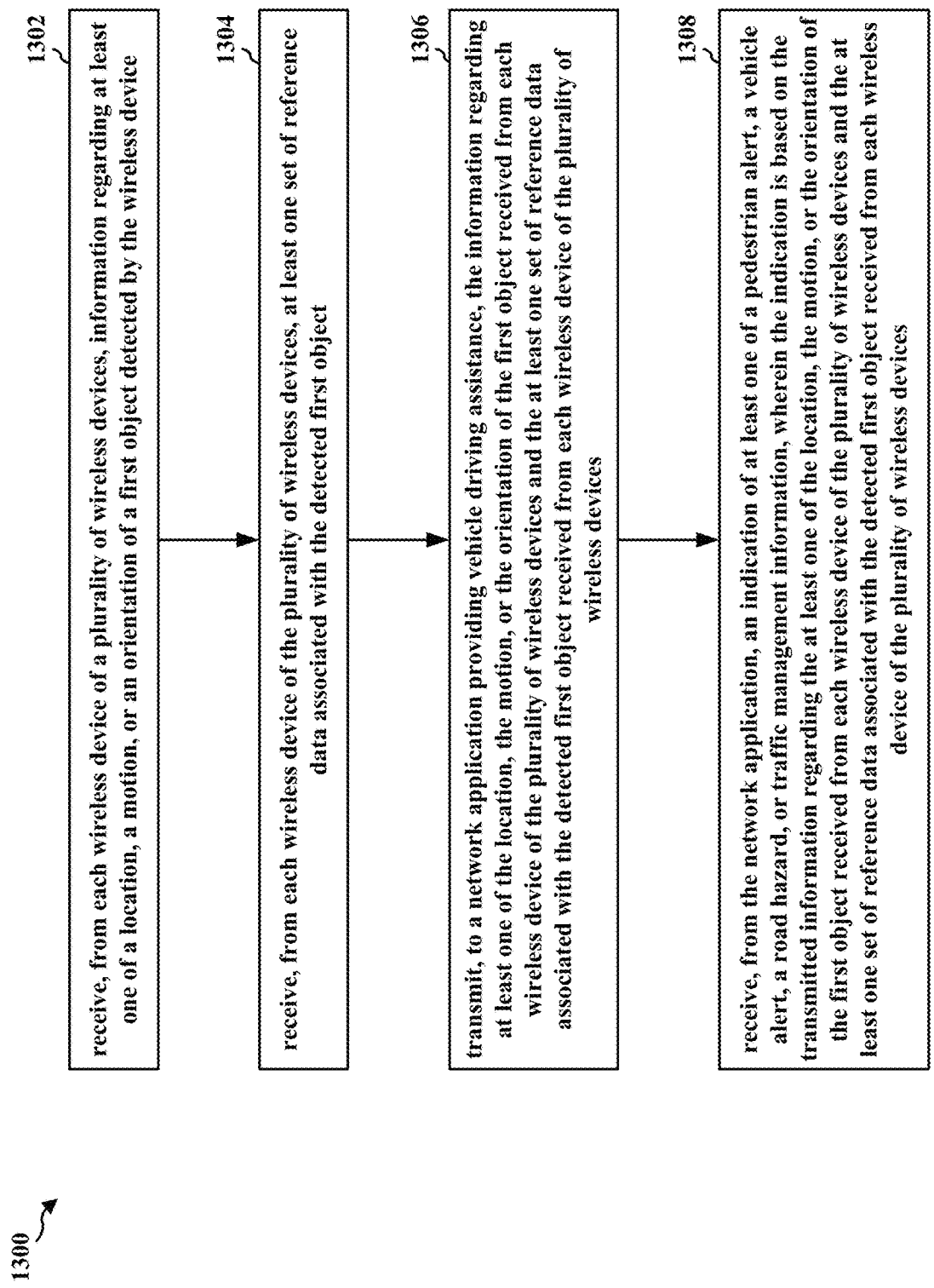
FIG. 13 is a flowchart of a method of wireless communication.

FIG. 13 is a flowchart 1300 of a method of wireless communication. The method may be performed by a base station or an RSU (e.g., the base station 102/180, 708, 808, or 822; the RSU 107; the apparatus 1602). At 1302, the base station or RSU may receive, from each wireless device of a plurality of wireless devices, information regarding at least one of a location of a first object detected by the wireless device, a motion of the first object, or an orientation of the first object. For example, 1302 may be performed by an enhanced sensor sharing component 1642. For example, referring to FIGS. 7 and 8, a base station 708 or 808 may receive information regarding the vehicle 706 or 806 and at least one set of reference data 720A and 720B from the vehicles 702 or 802 and 704 or 804.

At 1304, the base station or RSU may receive, from each wireless device of the plurality of wireless devices (e.g., vehicle 702 or 802 or vehicle 704 and 804), at least one set of reference data associated with the detected first object. For example, 1304 may be performed by an enhanced sensor sharing component 1642. In some aspects, the at least one set of reference data associated with the detected first object may be at least one of a static image, a set of images, a video, a radar point cloud, a lidar point cloud, or an ultrasound point cloud. The at least one set of reference data, in some aspects, is associated with at least one of the object ID, a message ID, a source ID associated with the wireless device from which it is received, or a time associated with the at least one set of reference data. In some aspects, the at least one set of reference data includes an association between the object ID with a set of data points of the at least one set of reference data. The set of data points may be associated with at least one of a color associated with the detected first object, a bounding box of the detected first object, or at least one identifying feature of the detected first object. For example, referring to FIGS. 7 and 8, the base station 708 or 808 may receive information regarding the detected at least one object and at least one set of reference data 720A and 720B from a first vehicle 702 or 802 and a second vehicle 704 or 804, respectively.

At 1306, the base station or RSU may transmit, to a network application providing vehicle driving assistance, the information regarding at least one of the location, the motion, or the orientation of the first object received from each wireless device of the plurality of wireless devices and the at least one set of reference data associated with the detected first object received from each wireless device of the plurality of wireless devices. For example, 1306 may be performed by an enhanced sensor sharing component 1642. For example, referring to FIGS. 7 and 8, the base station 708 or 808 may transmit to the network application 710 and 810 received information and reference data 722.

Finally, at 1308, the base station or RSU may receive, from the network application, an indication of at least one of a pedestrian alert, a vehicle alert, a road hazard, or traffic management information, where the indication is based on the transmitted information regarding the at least one of the location, the motion, or the orientation of the first object received from each wireless device of the plurality of wireless devices and the at least one set of reference data associated with the detected first object received from each wireless device of the plurality of wireless devices. For example, 1308 may be performed by an enhanced sensor sharing component 1642. The base station or RSU may then transmit at least one of the indication of at least one of a pedestrian alert, a vehicle alert, a road hazard, or traffic management information to one or more of the plurality of devices. For example, referring to FIGS. 7 and 8, the base station 708 or 808 may receive from the network application 710 and 810 processed information 726 and may transmit processed information 728.

Figure 14:
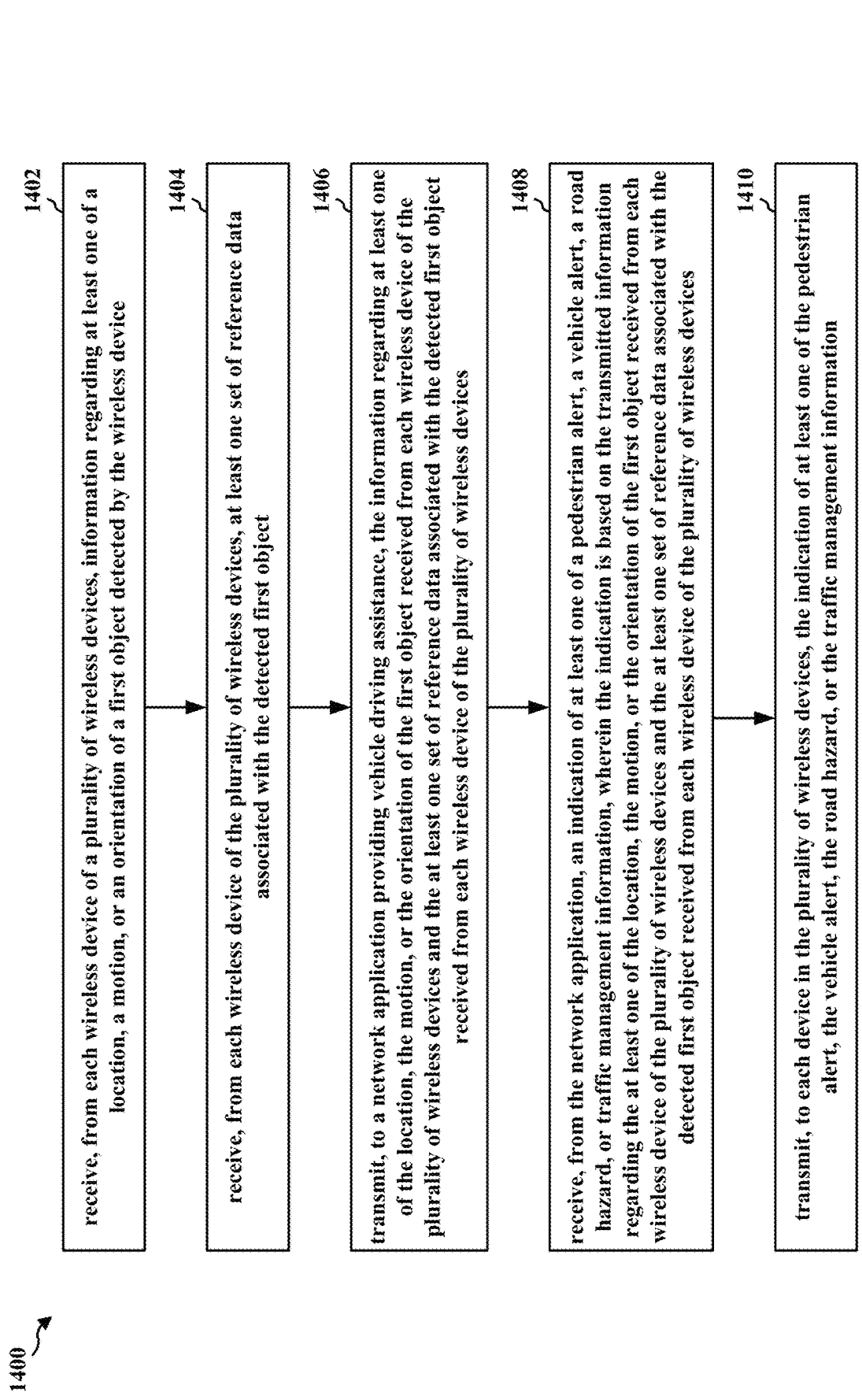
FIG. 14 is a flowchart of a method of wireless communication.

FIG. 14 is a flowchart 1400 of a method of wireless communication. The method may be performed by a base station or an RSU (e.g., the base station 102/180, 708, 808, or 822; the RSU 107; the apparatus 1602). At 1402, the base station or RSU may receive, from each wireless device of a plurality of wireless devices, information regarding at least one of a location of a first object detected by the wireless device, a motion of the first object, or an orientation of the first object. For example, 1402 may be performed by an enhanced sensor sharing component 1642. For example, referring to FIGS. 7 and 8, a base station 708 or 808 may receive information regarding the vehicle 706 or 806 and at least one set of reference data 720A and 720B from the vehicles 702 or 802 and 704 or 804.

At 1404, the base station or RSU may receive, from each wireless device of the plurality of wireless devices (e.g., vehicle 702 or 802 or vehicle 704 and 804), at least one set of reference data associated with the detected first object. For example, 1404 may be performed by an enhanced sensor sharing component 1642. In some aspects, the at least one set of reference data associated with the detected first object may be at least one of a static image, a set of images, a video, a radar point cloud, a lidar point cloud, or an ultrasound point cloud. The at least one set of reference data, in some aspects, is associated with at least one of the object ID, a message ID, a source ID associated with the wireless device from which it is received, or a time associated with the first detected object. In some aspects, the at least one set of reference data includes an association between the object ID with a set of data points of the at least one set of reference data. The set of data points may be associated with at least one of a color associated with the detected first object, a bounding box of the detected first object, or at least one identifying feature of the detected first object. For example, referring to FIGS. 7 and 8, the base station 708 or 808 may receive information regarding the detected at least one object and at least one set of reference data 720A and 720B from a first vehicle 702 or 802 and a second vehicle 704 or 804, respectively.

At 1406, the base station or RSU may transmit, to a network application providing vehicle driving assistance, the information regarding at least one of the location, the motion, or the orientation of the first object received from each wireless device of the plurality of wireless devices and the at least one set of reference data associated with the detected first object received from each wireless device of the plurality of wireless devices. For example, 1406 may be performed by an enhanced sensor sharing component 1642. For example, referring to FIGS. 7 and 8, the base station 708 or 808 may transmit to the network application 710 and 810 received information and reference data 722.

At 1408, the base station or RSU may receive, from the network application, an indication of at least one of a pedestrian alert, a vehicle alert, a road hazard, or traffic management information, where the indication is based on the transmitted information regarding the at least one of the location, the motion, or the orientation of the first object received from each wireless device of the plurality of wireless devices and the at least one set of reference data associated with the detected first object received from each wireless device of the plurality of wireless devices. For example, 1408 may be performed by an enhanced sensor sharing component 1642. The indication may further include updated (or improved) information regarding at least one of the location, the motion, or the orientation of the first object that is based on the aggregation of information received from the plurality of wireless devices. For example, referring to FIGS. 7 and 8, the base station 708 or 808 may receive from the network application 710 and 810 processed information 726 and may transmit processed information 728.

Finally, at 1410, the base station or RSU may transmit, to the plurality of wireless devices, the indication of at least one of the pedestrian alert, the vehicle alert, the road hazard, or the traffic management information. For example, 1410 may be performed by an enhanced sensor sharing component 1642. The indication may further include updated (or improved) information regarding at least one of the location, the motion, or the orientation of the first object that is based on the aggregation of information received from the plurality of wireless devices. For example, referring to FIGS. 7 and 8, the base station 708 or 808 may receive processed information 726 from the network application 710 and 810 and may transmit processed information 728 to the vehicles 702 or 802 and 704 or 808.

Figure 15:
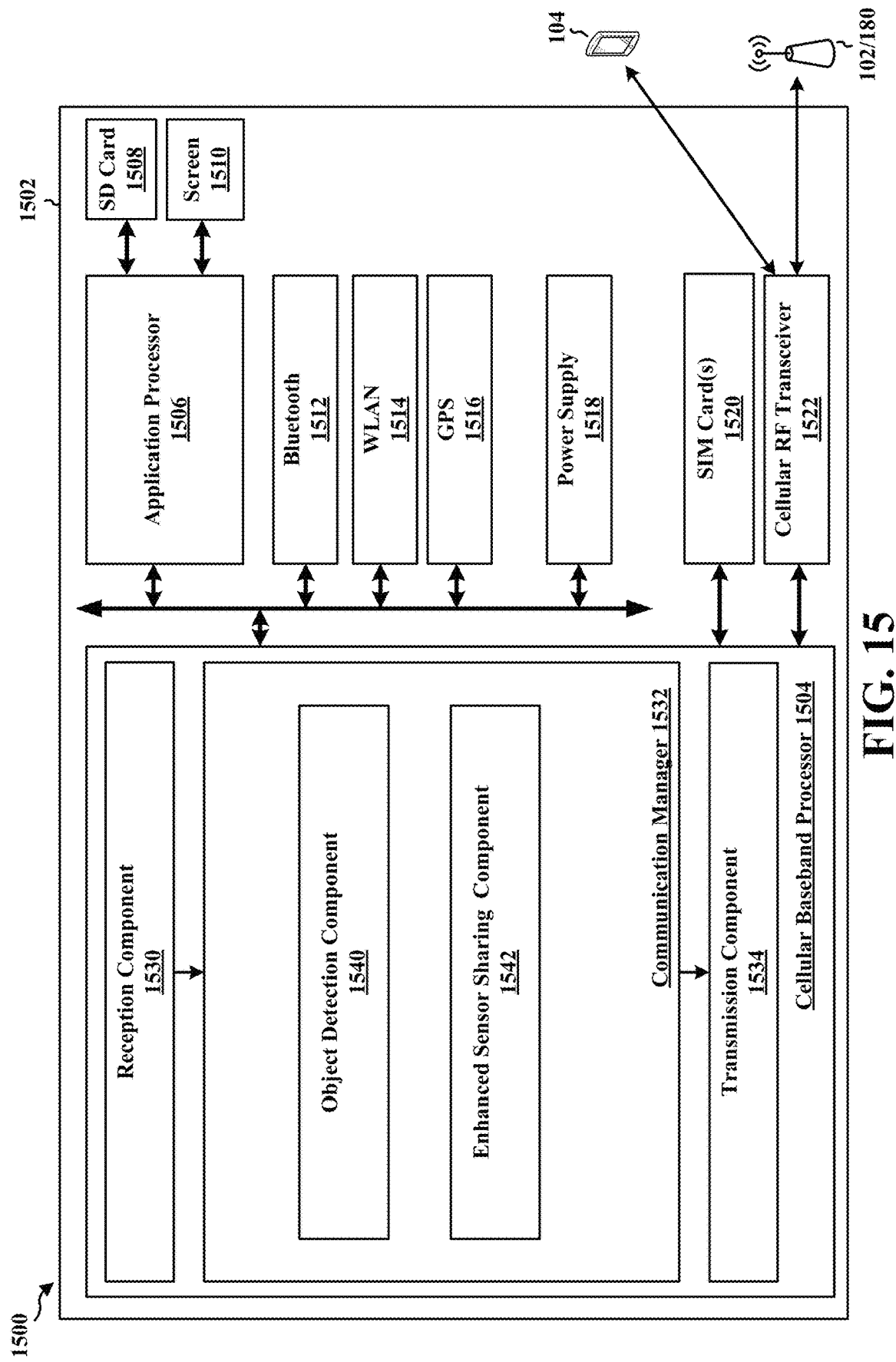
FIG. 15 is a diagram illustrating an example of a hardware implementation for an apparatus.

FIG. 15 is a diagram 1500 illustrating an example of a hardware implementation for an apparatus 1502. The apparatus 1502 may be a UE, a component of a UE, or may implement UE functionality. In some aspects, the apparatus 1502 may include a cellular baseband processor 1504 (also referred to as a modem) coupled to a cellular RF transceiver 1522. In some aspects, the apparatus 1502 may further include one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, or a power supply 1518. The cellular baseband processor 1504 communicates through the cellular RF transceiver 1522 with the UE 104 and/or BS 102/180. The cellular baseband processor 1504 may include a computer-readable medium/memory. The computer-readable medium/memory may be non-transitory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. The cellular baseband processor 1504 may be a component of the UE 450 and may include the memory 460 and/or at least one of the TX processor 468, the RX processor 456, and the controller/processor 459. In one configuration, the apparatus 1502 may be a modem chip and include just the baseband processor 1504, and in another configuration, the apparatus 1502 may be the entire UE (e.g., see 450 of FIG. 4) and include the additional modules of the apparatus 1502.

The communication manager 1532 includes an object detection component 1540 that is configured to detect, via at least one sensor, a first object, e.g., as described in connection with 902, 1002, 1102, and 1202 of FIGS. 9-12. The communication manager 1532 further includes an enhanced sensor sharing component 1542 that receives input in the form of information regarding the detected first object from the object detection component 1540 and is configured to capture at least one set of reference data associated with the detected first object, transmit (or receive) information regarding the detected first object and the at least one set of reference data associated with the detected first object, associate the captured at least one set of reference data with at least one of the object ID, a message ID, a source ID associated with a first wireless device, or a time associated with the detected first object, transmit (or receive) information regarding the first wireless device, where the information may include at least one of a location of the first wireless device, a motion of the first wireless device, an orientation of the first wireless device, or a planned operation of the first wireless device, receive additional information regarding the detected first object for improving an accuracy of at least one of a detected location of the detected first object or a detected motion of the detected first object, and update, based on the received information regarding the detected first object and the at least one set of reference data associated with the detected first object, at least one of the location of the detected first object, the motion of the detected first object, or the orientation of the detected first object, e.g., as described in connection with 904, 906, 1004-1012, 1104, 1106, 1204-1208 of FIGS. 9-12.

The apparatus may include additional components that perform each of the blocks of the algorithm in the flowcharts of FIGS. 9-12. As such, each block in the flowcharts of FIGS. 9-12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the cellular baseband processor 1504, includes means for detecting, via at least one sensor of the apparatus 1502, a first object. The apparatus 1502, and in particular the cellular baseband processor 1504, may further include means for capturing at least one set of reference data associated with the detected first object. The apparatus 1502, and in particular the cellular baseband processor 1504, may further include means for transmitting, to at least one second wireless device, information regarding the detected first object and the at least one set of reference data associated with the detected first object. The apparatus 1502, and in particular the cellular baseband processor 1504, may further include means for associating the at least one set of reference data with at least one of the object ID, a message identifier, a source identifier associated with the apparatus 1502, or a time associated with the at least one set of reference data. The apparatus 1502, and in particular the cellular baseband processor 1504, may further include means for transmitting information regarding the apparatus 1502, where the information includes at least one of a location of the apparatus 1502, a motion of the apparatus 1502, an orientation of the apparatus 1502, or a planned operation of the apparatus 1502. The apparatus 1502, and in particular the cellular baseband processor 1504, may further include means for receiving, from the at least one second wireless device, additional information regarding the detected first object for improving an accuracy of at least one of a detected location of the detected first object or a detected motion of the detected first object. The apparatus 1502, and in particular the cellular baseband processor 1504, may further include means for detecting, via at least one sensor of the apparatus 1502, at least one of a location of a first object, a motion of the first object, or an orientation of the first object. The apparatus 1502, and in particular the cellular baseband processor 1504, may further include means for receiving, from a first wireless device, information regarding the detected first object and at least one set of reference data associated with the detected first object. The apparatus 1502, and in particular the cellular baseband processor 1504, may further include means for updating, based on the received information regarding the detected first object and the at least one set of reference data associated with the detected first object, at least one of the location of the detected first object, the motion of the detected first object, or the orientation of the detected first object. The apparatus 1502, and in particular the cellular baseband processor 1504, may further include means for receiving, from the first wireless device, information regarding the first wireless device, where the information includes at least one of a location of the first wireless device, a motion of the first wireless device, an orientation of the first wireless device, or a planned operation of the first wireless device. The means may be one or more of the components of the apparatus 1502 configured to perform the functions recited by the means. As described supra, the apparatus 1502 may include the TX Processor 468, the RX Processor 456, and the controller/processor 459. As such, in one configuration, the means may be the TX Processor 468, the RX Processor 456, and the controller/processor 459 configured to perform the functions recited by the means.

Figure 16:
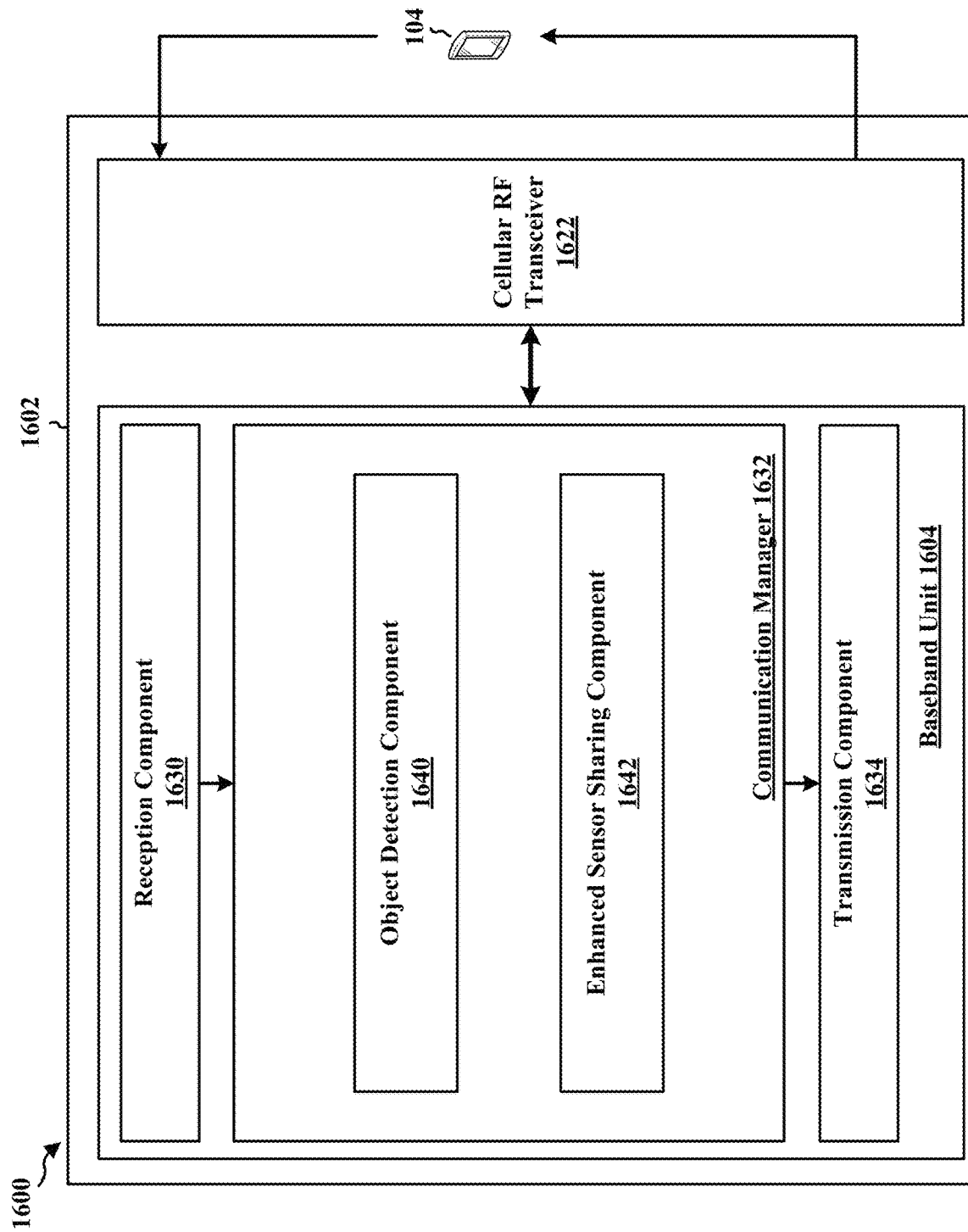
FIG. 16 is a diagram illustrating an example of a hardware implementation for an apparatus.

FIG. 16 is a diagram 1600 illustrating an example of a hardware implementation for an apparatus 1602. The apparatus 1602 may be a base station, a component of a base station, or may implement base station functionality. In some aspects, the apparatus 1502 may include a baseband unit 1604. The baseband unit 1604 may communicate through a cellular RF transceiver 1622 with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the base station 410 and may include the memory 476 and/or at least one of the TX processor 416, the RX processor 470, and the controller/processor 475.

The communication manager 1632 includes an object detection component 1640 that may detect, via at least one sensor the apparatus 1602, at least one of a location of a first object, a motion of the first object, or an orientation of the first object, e.g., as described in connection with 1102 or 1202 of FIGS. 11 and 12. The communication manager 1632 further includes an enhanced sensor sharing component 1642 that may receive, from each wireless device of a plurality of wireless devices, information regarding at least one of a location of a first object detected by the wireless device, a motion of the first object, or an orientation of the first object; may receive, from each wireless device of the plurality of wireless devices, at least one set of reference data associated with the detected first object; update, based on the received information regarding the detected first object and the at least one set of reference data associated with the detected first object, at least one of the location of the detected first object, the motion of the detected first object, or the orientation of the detected first object; transmit, to a network application providing vehicle driving assistance, the information regarding at least one of the location, the motion, or the orientation of the first object received from each wireless device of the plurality of wireless devices and the at least one set of reference data associated with the detected first object received from each wireless device of the plurality of wireless devices; receive, from the network application, an indication of at least one of a pedestrian alert, a vehicle alert, a road hazard, or traffic management information; and transmit, to the plurality of wireless devices, the indication of at least one of the pedestrian alert, the vehicle alert, the road hazard, or the traffic management information, e.g., as described in connection with 1104, 1106, 1204-1208, 1302-1308, and 1402-1410 of FIGS. 11-14.

The apparatus may include additional components that perform each of the blocks of the algorithm in the flowcharts of FIGS. 11-14. As such, each block in the flowcharts of FIGS. 11-14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the baseband unit 1604, includes means for detecting, via at least one sensor of the apparatus 1602, at least one of a location of a first object, a motion of the first object, or an orientation of the first object. The apparatus 1602, and in particular the baseband unit 1604, may further include means for receiving, from a first wireless device, information regarding the detected first object and at least one set of reference data associated with the detected first object. The apparatus 1602, and in particular the baseband unit 1604, may further include means for updating, based on the received information regarding the detected first object and the at least one set of reference data associated with the detected first object, at least one of the location of the detected first object, the motion of the detected first object, or the orientation of the detected first object. The apparatus 1602, and in particular the baseband unit 1604, may further include means for receiving, from the first wireless device, information regarding the first wireless device, where the information includes at least one of a location of the first wireless device, a motion of the first wireless device, an orientation of the first wireless device, or a planned operation of the first wireless device. The apparatus 1602, and in particular the baseband unit 1604, may further include means for receiving, from each wireless device in a plurality of wireless devices, information regarding at least one of a location of a first object detected by a corresponding wireless device in the plurality of wireless devices, a motion of the first object, or an orientation of the first object. The apparatus 1602, and in particular the baseband unit 1604, may further include means for receiving, from each wireless device of the plurality of wireless devices, at least one set of reference data associated with the detected first object. The apparatus 1602, and in particular the baseband unit 1604, may further include means for transmitting, to a network application providing vehicle driving assistance, the information regarding at least one of the location of the first object, the motion of the first object, or the orientation of the first object received from each wireless device of the plurality of wireless devices and the at least one set of reference data associated with the detected first object received from each wireless device of the plurality of wireless devices. The apparatus 1602, and in particular the baseband unit 1604, may further include means for receiving, from the network application, an indication of at least one of a pedestrian alert, a vehicle alert, a road hazard, or traffic management information, where the indication is based on the transmitted information regarding the at least one of the location of the first object, the motion of the first object, or the orientation of the first object received from each wireless device of the plurality of wireless devices and the at least one set of reference data associated with the detected first object received from each wireless device of the plurality of wireless devices. The apparatus 1602, and in particular the baseband unit 1604, may further include means for transmitting, to each wireless device in the plurality of wireless devices, the indication of at least one of the pedestrian alert, the vehicle alert, the road hazard, or the traffic management information. The means may be one or more of the components of the apparatus 1602 configured to perform the functions recited by the means. As described supra, the apparatus 1602 may include the TX Processor 416, the RX Processor 470, and the controller/processor 475. As such, in one configuration, the means may be the TX Processor 416, the RX Processor 470, and the controller/processor 475 configured to perform the functions recited by the means.

In some aspects of wireless communication, standards are defined for sensor-sharing, e.g., the exchange of information regarding detected objects/VRUs/vehicles between vehicles, or between vehicles and infrastructure components, such as roadside units (RSUs). By collecting information from multiple vehicles, RSUs can form a more accurate picture of a driving environment in order to improve the situational awareness of vehicles. In some aspects, cloud-based entities can aggregate input from vehicles and RSUs in order to provide driving instructions and alerts to vehicles.

As described above, in some aspects, sensor sharing standards indicate reporting detected object characteristics, including location, motion state, and classification. Location and motion state may be inherently limited in accuracy due to (1) inaccuracy in the location of the vehicle detecting the object and/or (2) inaccuracy in the detection of the object location and motion state. These errors may make it difficult for a receiver of sensor sharing messages to determine if a reported object matches an object it has detected with its own sensors, or to determine if the reported object matches a detected object reported by another vehicle. For an RSU or cloud entity aggregating input from various sources in order to provide situational awareness and driving instructions, this ambiguity may degrade the ability to accurately interpret the environment and to provide useful guidance to vehicles.

Accordingly, a mechanism for vehicle-reported or RSU-reported sensor sharing messages to be coupled with reference data including at least of an image, a set of images, a video, a lidar point cloud, a radar point cloud and/or an ultrasound point cloud is presented herein. Associating additional information may enable a receiver of sensor sharing messages or information to associate the object described in sensor sharing messages with detections made by its own sensors and associate sensor sharing messages from multiple senders/devices. This additional information (e.g., reference data) may be included by a transmitting device in each sensor sharing information message or may be included based on a threshold accuracy of its ability to determine a detected object location and motion state.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method for wireless communication including detecting, via at least one sensor of the first UE, a first object; capturing at least one set of reference data associated with the detected first object; and transmitting, to at least one second wireless device, information regarding the detected first object and the at least one set of reference data associated with the detected first object.

Aspect 2 is the method of aspect 1, where the at least one set of reference data includes at least one of a static image, a set of images, a video, a radar point cloud, a lidar point cloud, or an ultrasound point cloud.

Aspect 3 is the method of any of aspects 1 and 2, where the information regarding the detected first object includes at least one of a location of the detected first object, a motion of the detected first object, an orientation of the detected first object, and an object ID associated with the detected first object.

Aspect 4 is the method of aspect 3, further including associating the at least one set of reference data with at least one of the object ID, a message identifier, a source identifier associated with the first UE, or a time associated with the detected first object.

Aspect 5 is the method of aspect 4, where associating the at least one set of reference data with the object ID includes associating the object ID with a set of data points of the at least one set of reference data.

Aspect 6 is the method of aspect 5, where the set of data points is associated with at least one of a color associated with the detected first object, a bounding box of the detected first object, or at least one identifying feature of the detected first object.

Aspect 7 is the method of any of aspects 1 to 6, further including transmitting information regarding the first UE, where the information includes at least one of a location of the first UE, a motion of the first UE, an orientation of the first UE, or a planned operation of the first UE.

Aspect 8 is the method of aspect 7, where the information regarding the first UE further includes a measurement of an accuracy of at least one of the location of the first UE, the motion of the first UE, or the orientation of the first UE.

Aspect 9 is the method of any of aspects 1 to 8, further including receiving, from the at least one second wireless device, additional information regarding the detected first object for improving an accuracy of at least one of a detected location of the detected first object or a detected motion of the detected first object.

Aspect 10 is the method of aspect 9, where the first UE is a first vehicle and the at least one second wireless device is one of a road side unit (RSU), a second vehicle, a vulnerable road unit, a second UE, or a base station.

Aspect 11 is a method for wireless communication at a second wireless device including detecting, via at least one sensor of the second wireless device, at least one of a location of a first object, a motion of the first object, or an orientation of the first object; receiving, from a first wireless device, information regarding the detected first object and at least one set of reference data associated with the detected first object; and updating, based on the received information regarding the detected first object and the at least one set of reference data associated with the detected first object, at least one of the location of the detected first object, the motion of the detected first object, or the orientation of the detected first object.

Aspect 12 is the method of aspect 11, where the at least one set of reference data includes at least one of a static image, a set of images, a video, a radar point cloud, a lidar point cloud, or an ultrasound point cloud.

Aspect 13 is the method of any of aspects 11 and 12, where the information regarding the detected first object received from the first wireless device includes at least one of a location of the detected first object determined by the first wireless device, a motion of the detected first object determined by the first wireless device, an orientation of the detected first object determined by the first wireless device, and an object ID associated with the detected first object by the first wireless device.

Aspect 14 is the method of aspect 13, where the at least one set of reference data is associated with at least one of the object ID, a message identifier, a source identifier associated with the first wireless device, or a time associated with the detected first object.

Aspect 15 is the method of aspect 14, where the at least one set of reference data associated with the object ID includes an association the object ID of the detected object with a set of data points of the detected first object.

Aspect 16 is the method of aspect 15, where the set of data points is associated with at least one of a color associated with the detected first object, a bounding box of the detected first object, or at least one identifying feature of the detected first object.

Aspect 17 is the method of any of aspects 11 to 16, further including receiving, from the first wireless device, information regarding the first wireless device, where the information includes at least one of a location of the first wireless device, a motion of the first wireless device, an orientation of the first wireless device, or a planned operation of the first wireless device.

Aspect 18 is the method of aspect 17, where the information regarding the first wireless device further includes a measurement of an accuracy of at least one of the location of the first wireless device, the motion of the first wireless device, or the orientation of the first wireless device.

Aspect 19 is the method of any of aspects 1 to 18, where the first wireless device is a first vehicle and the second wireless device is one of an RSU, a second vehicle, a second UE, or a base station.

Aspect 20 is a method for wireless communication at a second wireless device including receiving, from each wireless device in a plurality of wireless devices, information regarding at least one of a location of a first object detected by a corresponding wireless device in the plurality of wireless devices, a motion of the first object, or an orientation of the first object; receiving, from each wireless device of the plurality of wireless devices, at least one set of reference data associated with the detected first object; transmitting, to a network application providing vehicle driving assistance, the information regarding at least one of the location of the first object, the motion of the first object, or the orientation of the first object received from each wireless device of the plurality of wireless devices and the at least one set of reference data associated with the detected first object received from each wireless device of the plurality of wireless devices; and receiving, from the network application, an indication of at least one of a pedestrian alert, a vehicle alert, a road hazard, or traffic management information, where the indication is based on the transmitted information regarding the at least one of the location of the first object, the motion of the first object, or the orientation of the first object received from each wireless device of the plurality of wireless devices and the at least one set of reference data associated with the detected first object received from each wireless device of the plurality of wireless devices.

Aspect 21 is the method of aspect 20, further including transmitting, to each wireless device in the plurality of wireless devices, the indication of at least one of the pedestrian alert, the vehicle alert, the road hazard, or the traffic management information.

Aspect 22 is the method of any of aspects 20 and 21, where the indication of at least one of the pedestrian alert, the vehicle alert, the road hazard, or the traffic management information further includes updated information regarding at least one of the location of the first object, the motion of the first object, or the orientation of the first object.

Aspect 23 is the method of any of aspects 20 to 22, where the second wireless device is one of a small cell base station, a road side unit, or a base station and the network application is one of a cloud-based application or a computing device at the second wireless device for processing the information regarding at least one of the location of the first object, the motion of the first object, or the orientation of the first object received from each wireless device of the plurality of wireless devices and the at least one set of reference data associated with the detected first object received from each wireless device of the plurality of wireless devices.

Aspect 24 is an apparatus for wireless communication including a memory and at least one processor coupled to the memory configured to implement any of aspects 1 to 23.

Aspect 25 is an apparatus for wireless communication including means for implementing any of aspects 1 to 23.

Aspect 26 is a computer-readable medium storing computer executable code, where the code when executed by a processor causes the processor to implement any of aspects 1 to 23.

What is claimed is:

1. An apparatus for wireless communication at a first user equipment (UE), comprising:
memory; and
at least one processor coupled to the memory and configured to:
detect, based on first information from at least one sensor of the first UE, a first object;
calculate, for the detected first object, at least one of a motion of the detected first object or an orientation of the detected first object;
associate the first object with an object identifier (ID);
capture at least one set of reference data associated with the detected first object;
transmit, to at least one second wireless device, second information regarding the detected first object, wherein the second information is associated with a set of IDs, and wherein the second information comprises the object ID and at least one of the calculated motion of the detected first object or the calculated orientation of the detected first object;
associate the at least one set of reference data with at least one ID, wherein the at least one ID is one of an ID in the set of IDs or the object ID associated with the first object; and
transmit, to the at least one second wireless device, the at least one set of reference data associated with the at least one ID.

2. The apparatus of claim 1, wherein the at least one set of reference data comprises at least one of a static image, a set of images, a video, a radar point cloud, a lidar point cloud, or an ultrasound point cloud.

3. The apparatus of claim 1, wherein the at least one processor is further configured to:
calculate, for the detected first object, a location of the detected first object, wherein the second information regarding the detected first object includes the calculated location of the detected first object and the at least one ID comprises an object ID associated with the detected first object.

4. The apparatus of claim 1, wherein the set of IDs comprises one or more of a message ID, a source ID associated with the first UE, or a time associated with the second information.

5. The apparatus of claim 4, wherein the object ID is associated with a set of data points of the at least one set of reference data.

6. The apparatus of claim 5, wherein the object ID is further associated with at least one of a color associated with the detected first object, a bounding box of the detected first object, or at least one identifying feature of the detected first object.

7. The apparatus of claim 1, wherein the at least one processor is further configured to:
transmit additional information regarding the first UE, wherein the additional information includes at least one of a location of the first UE, a motion of the first UE, an orientation of the first UE, or a planned operation of the first UE, and wherein the additional information regarding the first UE further includes a measurement of an accuracy of at least one of the location of the first UE, the motion of the first UE, or the orientation of the first UE.

8. The apparatus of claim 1, further comprising a transceiver coupled to the at least one processor.

9. The apparatus of claim 1, wherein to transmit the at least one set of reference data, the at least one processor is configured to transmit the at least one set of reference data based on a threshold accuracy and an accuracy associated with an ability of the first UE to determine one or more of a location of the detected first object or the motion of the detected first object.

10. The apparatus of claim 1, wherein the at least one processor is further configured to:
receive, from the at least one second wireless device, additional information regarding the detected first object for improving an accuracy of at least one of a detected location of the detected first object or a detected motion of the detected first object; and
update, based on the additional information, at least one of the detected location of the detected first object or the detected motion of the detected first object.

11. The apparatus of claim 10, wherein the first UE is a first vehicle and the at least one second wireless device is one of a road side unit (RSU), a second vehicle, a vulnerable road unit, a second UE, or a base station.

12. An apparatus for wireless communication at a second wireless device, comprising:
memory; and
at least one processor coupled to the memory and configured to:
detect, based on first information from at least one sensor of the second wireless device, a first object;
calculate, for the detected first object, at least one of a location of the detected first object, a motion of the detected first object, or an orientation of the detected first object;
receive, from a first wireless device, second information regarding the detected first object, wherein the second information is associated with a set of identifiers (IDs), and wherein the second information comprises an object ID associated with the first object and at least one of an additional calculated motion of the detected first object or an additional calculated orientation of the detected first object;
receive, from the first wireless device, at least one set of reference data associated with the detected first object, wherein the at least one set of reference data is associated with at least one ID, wherein the at least one ID is one of an ID in the set of IDs or the object ID associated with the first object; and
update, based on the at least one set of reference data and the received second information regarding the detected first object, at least one of the calculated location of the detected first object, the calculated motion of the detected first object, or the calculated orientation of the detected first object.

13. The apparatus of claim 12, wherein the at least one set of reference data comprises at least one of a static image, a set of images, a video, a radar point cloud, a lidar point cloud, or an ultrasound point cloud.

14. The apparatus of claim 12, wherein the second information regarding the detected first object received from the first wireless device includes an additional calculated location of the detected first object and the at least one ID comprises an object ID associated with the detected first object by the first wireless device.

15. The apparatus of claim 12, wherein the set of IDs comprises at least one of a message ID, a source ID associated with the first wireless device, or a time associated with the second information.

16. The apparatus of claim 15, wherein the at least one set of reference data associated with the object ID includes an association of the object ID of the detected object with a set of data points of the detected first object.

17. The apparatus of claim 16, wherein the object ID is associated with at least one of a color associated with the detected first object, a bounding box of the detected first object, or at least one identifying feature of the detected first object.

18. The apparatus of claim 12, wherein the at least one processor is further configured to:
receive, from the first wireless device, additional information regarding the first wireless device, wherein the additional information includes at least one of a location of the first wireless device, a motion of the first wireless device, an orientation of the first wireless device, or a planned operation of the first wireless device.

19. The apparatus of claim 18, wherein the additional information regarding the first wireless device further includes a measurement of an accuracy of at least one of the location of the first wireless device, the motion of the first wireless device, or the orientation of the first wireless device.

20. The apparatus of claim 12, wherein the first wireless device is a first vehicle and the second wireless device is one of a road side unit (RSU), a second vehicle, a second UE, or a base station.

21. The apparatus of claim 12, further comprising a transceiver coupled to the at least one processor.

22. An apparatus for wireless communication at a second wireless device, comprising:
memory; and
at least one processor coupled to the memory and configured to:
receive, from each wireless device in a plurality of wireless devices, information regarding at least one of a location of a first object, a motion of the first object, or an orientation of the first object calculated by the wireless device in the plurality of wireless devices, wherein the information is associated with a set of identifiers (IDs), and wherein the information comprises an object ID assigned by the wireless device;
receive, from each wireless device of the plurality of wireless devices, at least one set of reference data associated with a detected first object, wherein the at least one set of reference data is associated with at least one ID, wherein the at least one ID is one of an ID in the set of IDs or the object ID associated with the first object;
transmit, to a network application providing vehicle driving assistance, the information regarding the at least one of the calculated location of the first object, the calculated motion of the first object, or the calculated orientation of the first object received from each wireless device of the plurality of wireless devices and the at least one set of reference data associated with the detected first object received from each wireless device of the plurality of wireless devices; and
receive, from the network application, an indication of at least one of a pedestrian alert, a vehicle alert, a road hazard, or traffic management information, wherein the indication is based on the transmitted information regarding the at least one of the location of the first object, the motion of the first object, or the orientation of the first object received from each wireless device of the plurality of wireless devices and the at least one set of reference data associated with the detected first object received from each wireless device of the plurality of wireless devices.

23. The apparatus of claim 22, wherein the at least one processor is further configured to:
transmit, to each wireless device in the plurality of wireless devices, the indication of at least one of the pedestrian alert, the vehicle alert, the road hazard, or the traffic management information.

24. The apparatus of claim 23, wherein the indication of at least one of the pedestrian alert, the vehicle alert, the road hazard, or the traffic management information further comprises updated information regarding at least one of the location of the first object, the motion of the first object, or the orientation of the first object.

25. The apparatus of claim 22, wherein the second wireless device is one of a small cell base station, a road side unit, or a base station and the network application is one of a cloud-based application or a computing device at the second wireless device for processing the information regarding at least one of the location of the first object, the motion of the first object, or the orientation of the first object received from each wireless device of the plurality of wireless devices and the at least one set of reference data associated with the detected first object received from each wireless device of the plurality of wireless devices.

26. The apparatus of claim 22, further comprising a transceiver coupled to the at least one processor.

27. A method for wireless communication at a first user equipment (UE), comprising:
detecting, based on first information from at least one sensor of the first UE, a first object;
calculating, for the detected first object, at least one of a motion of the detected first object or an orientation of the detected first object;
associating the first object with an object identifier (ID);
capturing at least one set of reference data associated with the detected first object;
transmitting, to at least one second wireless device, second information regarding the detected first object, wherein the second information is associated with a set of IDs, and wherein the second information comprises the object ID and at least one of the calculated motion of the detected first object or the calculated orientation of the detected first object;
associating the at least one set of reference data with at least one ID, wherein the at least one ID is one of an ID in the set of IDs or the object ID associated with the first object; and
transmitting, to the at least one second wireless device, the at least one set of reference data associated with the at least one ID.

28. The method of claim 27, wherein the set of IDs comprises at least one of a message ID, a source ID associated with the first UE, or a time associated with the second information.

29. The method of claim 27, further comprising:
transmitting additional information regarding the first UE, wherein the additional information includes at least one of a location of the first UE, a motion of the first UE, an orientation of the first UE, or a planned operation of the first UE.

30. The method of claim 27, further comprising:
receiving, from the at least one second wireless device, additional information regarding the detected first object for improving an accuracy of at least one of a detected location of the detected first object or a detected motion of the detected first object.

* * * * *